(12) United States Patent
Zhang

(10) Patent No.: US 11,766,961 B2
(45) Date of Patent: Sep. 26, 2023

(54) DEVICE FOR ADJUSTING SOFTNESS OF SEAT, DEVICE FOR ADJUSTING COMFORT OF SEAT, AND VEHICLE SEAT

(71) Applicant: LANGFANG GOLDEN TIME TECHNOLOGY DEVELOPMENT CO., LTD., Hebei (CN)

(72) Inventor: Haitao Zhang, Langfang (CN)

(73) Assignee: LANGFANG GOLDEN TIME TECHNOLOGY DEVELOPMENT CO., LTD., Langfang (CN)

( * ) Notice: Subject to any disclaimer, the term of this patent is extended or adjusted under 35 U.S.C. 154(b) by 275 days.

(21) Appl. No.: 17/281,533

(22) PCT Filed: Jul. 14, 2020

(86) PCT No.: PCT/CN2020/101960
§ 371 (c)(1),
(2) Date: Mar. 30, 2021

(87) PCT Pub. No.: WO2021/093358
PCT Pub. Date: May 20, 2021

(65) Prior Publication Data
US 2022/0305975 A1 Sep. 29, 2022

(30) Foreign Application Priority Data

Nov. 13, 2019 (CN) .......................... 201911107177.0
Nov. 13, 2019 (CN) .......................... 201911108212.0
Nov. 13, 2019 (CN) .......................... 201911108223.9

(51) Int. Cl.
*B60N 2/60* (2006.01)
*B60N 2/90* (2018.01)
(Continued)

(52) U.S. Cl.
CPC ............... *B60N 2/914* (2018.02); *B60N 2/02* (2013.01); *A47C 1/0244* (2013.01); *A47C 7/467* (2013.01); *B60N 2/665* (2015.04); *B60N 2/7082* (2013.01)

(58) Field of Classification Search
CPC .... A47C 1/0244; A47C 7/467; B60N 2/7082; B60N 2/665; B60N 2/914
See application file for complete search history.

(56) References Cited

U.S. PATENT DOCUMENTS 3,326,601 A * 6/1967 Parkinson ............ B60N 2/7082
297/284.6
4,371,997 A 2/1983 Mattson
(Continued)

FOREIGN PATENT DOCUMENTS

CN 102657457 A 9/2012
CN 103448590 A 12/2013
(Continued)

OTHER PUBLICATIONS

International Search Report and Written Opinion of the ISA dated Oct. 15, 2020 as received in Application No. PCT/CN2020/101960.
(Continued)

*Primary Examiner* — Syed A Islam
(74) *Attorney, Agent, or Firm* — Maschoff Brennan

(57) ABSTRACT

Provide are a device for adjusting softness of a vehicle seat, a device for adjusting comfort of a seat, and a vehicle seat. The device for adjusting softness of a vehicle seat has at least one soft inflatable bag that can be integrated in the seat. The soft inflatable bag is connected with at least one air path. The soft inflatable bag is filled with a flexible filler. Gas is charged into or discharged from the soft inflatable bag through the air path to adjust the softness of the surface of the seat. The soft inflatable bag is provided therein with a
(Continued)

height limiting structure configured to limit the partial expansion height of the soft inflatable bag when inflated.

20 Claims, 10 Drawing Sheets

(51) Int. Cl.
*B60N 2/02* (2006.01)
*A47C 7/46* (2006.01)
*B60N 2/70* (2006.01)
*A47C 1/024* (2006.01)
*B60N 2/66* (2006.01)

(56) References Cited

U.S. PATENT DOCUMENTS

| | | | | |
|---|---|---|---|---|
| 4,920,591 | A * | 5/1990 | Sekido | B60N 2/99 |
| | | | | 297/287 |
| 5,176,424 | A * | 1/1993 | Tobita | A47C 4/54 |
| | | | | 297/452.52 |
| 5,902,010 | A * | 5/1999 | Cuevas | B60N 2/4221 |
| | | | | 297/DIG. 8 |
| 7,000,948 | B2 * | 2/2006 | Little | B60R 21/01516 |
| | | | | 280/743.1 |
| 8,181,292 | B1 * | 5/2012 | Pellettiere | B60N 2/4279 |
| | | | | 5/713 |
| 9,956,897 | B2 * | 5/2018 | Gagnier | B60N 2/914 |
| 10,576,855 | B2 * | 3/2020 | Dörfler | B60N 2/665 |
| 11,046,224 | B2 * | 6/2021 | Nagasawa | B60N 2/42718 |
| 11,076,698 | B2 * | 8/2021 | Munechika | B60N 2/665 |

FOREIGN PATENT DOCUMENTS

| | | |
|---|---|---|
| CN | 104627031 A | 5/2015 |
| CN | 206327201 U | 7/2017 |
| CN | 110774948 A | 2/2020 |
| CN | 110774949 A | 2/2020 |
| CN | 110789409 A | 2/2020 |
| CN | 110861540 A | 3/2020 |
| CN | 110877550 A | 3/2020 |
| JP | 11-342775 A | 12/1999 |
| WO | 2019/160214 A1 | 8/2019 |

OTHER PUBLICATIONS

International Search Report and Written Opinion issued in corresponding application No. PCT/CN2020/101960, dated Mar. 29, 2021.
International Preliminary Report on Patentability issued in corresponding application No. PCT/CN2020/101960, dated May 17, 2022.

* cited by examiner

DEVICE FOR ADJUSTING SOFTNESS OF SEAT, DEVICE FOR ADJUSTING COMFORT OF SEAT, AND VEHICLE SEAT

CROSS-REFERENCE TO RELATED APPLICATIONS

This application is the U.S. National Stage of Chinese PCT application no. PCT/CN2020/101960 filed Jul. 14, 2020.

The present disclosure claims priority to: Chinese Patent Application No. 201911107177.0, filed with the Chinese Patent Office on Nov. 13, 2019, entitled "Device for Adjusting Softness of Seat and Vehicle Seat", Chinese Patent Application No. 201911108212.0, filed with the Chinese Patent Office on Nov. 13, 2019, entitled "Device for Adjusting Comfort of Seat and Vehicle Seat", and Chinese Patent Application No. 201911108223.9, filed with the Chinese Patent Office on Nov. 13, 2019, entitled "Vehicle Seat with Adjustable Comfort", which are incorporated herein by reference in their entireties.

TECHNICAL FIELD

The present disclosure relates to the technical field of vehicle seats, and in particular to a device for adjusting softness of a seat, a device for adjusting comfort of a seat, and a vehicle seat.

BACKGROUND ART

In recent years, with people's understanding and improvement of comfort of seats, people have gradually realized that intelligent adjustability of softness (or hardness) of the surface of a seat has important significance and influence on the enhancement and research of comfort, in addition to the fact that a comfortable seat is traditionally believed to have a good wrap-around ergonomic design and good softness, breathability, and supporting capability.

A prior art structure for adjusting softness of a seat by means of air has the following disadvantages. The swelling shape of an inflatable airbag causes swelling of the surface of the seat, whereby its hardness is increased, while the model of the surface of the seat is changed by the convexity of the seat surface. The position of the seat surface occupied by a human body who is directly sitting therein is changed, resulting in reduced comfort when sitting in the seat.

SUMMARY

The present disclosure provides a device for adjusting softness of a seat, a device for adjusting comfort of a seat, and a vehicle seat, by which improved comfort can be obtained when sitting in the seat.

Embodiments of the present disclosure may be implemented as follows:

In a first aspect, an embodiment of the present disclosure provides a device for adjusting softness of a seat. The device for adjusting softness of a seat has at least one soft inflatable bag that can be integrated in the seat. The soft inflatable bag is connected with at least one air path. The soft inflatable bag is filled with a flexible filler. Gas is charged into or discharged from the soft inflatable bag through the air path to adjust the softness of a surface of the seat.

The soft inflatable bag is provided with a height limiting structure configured to limit the partial expansion height of the soft inflatable bag when inflated.

The device for adjusting softness of a seat consists mainly of a soft inflatable bag. The soft inflatable bag is provided with a flexible filler. The softness of each part of the surface of the seat can be adjusted by inflation and deflation of the soft inflatable bag. Since this device is arranged independently, the supporting performance of the entire seat is not affected. The flexible filler can avoid collapse and unevenness of the seat surface caused by collapse of the bag body when gas is completely discharged from the soft inflatable bag. The distance between the two upper and lower layers of the bag body of the soft inflatable bag can be restricted by the height limiting structure to avoid abnormal protrusion and deformation of the surface of the seat caused by bulging of the soft inflatable bag when inflated, so that the partial shape of the soft inflatable bag undergoes a predictable shape change during inflation. In this way, when the hardness of the seat is adjusted, there is still a large enough contact area between the occupant and the seat, and the surface of the soft inflatable bag is more conformable to the shape of the surface of the seat, thereby further improving the appearance, comfort, and stability of the surface of the seat.

Optionally, the height limiting structure is a penetrating-type height limiting strap and/or a built-in height limiting strap.

Optionally, the height limiting structure is provided with an opening. The opening is configured to conduct the gas on both sides of the height limiting structure.

Optionally, the height limiting structures are arranged in a distributed manner.

Optionally, the soft inflatable bag is provided with a number of air guide channels extending through the soft inflatable bag. The air guide channels are isolated from an inflatable cavity of the soft inflatable bag and configured to conduct the gas on both sides of the soft inflatable bag.

Air guide channels are provided in the soft inflatable bag, so that an air flow delivered from a ventilation structure of the seat can be directed from one side to the other side of the soft inflatable bag, whereby the seat can be integrated with ventilation and softness adjustment functions.

In a second aspect, an embodiment of the present disclosure provides a vehicle seat. The vehicle seat includes a backrest and/or a seat cushion and/or side wings into which the device for adjusting softness of a seat described above is integrated. An air source of the soft inflatable bag is supplied by a micro air pump, or by compressed air in the vehicle body. The soft inflatable bag is located on a surface of a foam structure of the vehicle seat, and a flexible liner is laid outside the soft inflatable bag located on the surface.

Optionally, at least two layers of the soft inflatable bags are arranged in an adjacently stacked or spacedly stacked manner in a softness adjustment region of the vehicle seat. The softness adjustment region is a region in the vehicle seat in which the soft inflatable bags are arranged.

The soft inflatable bags in the seat are arranged in multiple layers to achieve different softness adjustments, so that the softness of the seat can be adjusted within an increased range to meet more requirements in use.

Optionally, the foam structure of the vehicle seat is provided therein with a soft inflatable bag accommodating groove configured for placement of the soft inflatable bag.

Optionally, the foam structure is further provided therein with a covering body accommodating groove located in a direction of an opening of the soft inflatable bag accommodating groove and configured for placement of a covering body. A trapezoidal structure is formed by the covering body accommodating groove and the soft inflatable bag accommodating groove adjacent thereto.

The covering body accommodating groove and the soft inflatable bag accommodating groove being in a trapezoidal shape can accommodate a covering body and a soft inflatable bag, respectively. The trapezoidal structure facilitates corresponding placement by an operator, and the covering body may have a larger covering area than that of the soft inflatable bag. In this way, the covering body can completely cover the soft inflatable bag, and thus the covering body can completely shield the edge of the soft inflatable bag.

Optionally, a heating pad is arranged between a seat cover and the soft inflatable bag in the soft inflatable bag accommodating groove located on a side adjacent to the seat surface.

The ventilation and/or heating and softness adjustment functions can be further integrated by providing a heating pad.

Optionally, solenoid valve modules are mounted in the air paths of all the soft inflatable bags in the vehicle seat, respectively, and a control module of the vehicle seat controls the inflation and deflation of each of the soft inflatable bags independently of one another by controlling ON and OFF of each of the solenoid valve modules.

Alternatively, all the soft inflatable bags in the vehicle seat are arranged in groups, and the air paths of each group of soft inflatable bags converge on a branch air path in which a branch solenoid valve module is mounted. The control module controls the inflation and deflation of each group of soft inflatable bags by controlling ON and OFF of each group of the branch solenoid valve module.

The softness of different parts of the seat can be adjusted differently by controlling the soft inflatable bags in the seat independently of one another. In an optional embodiment, the soft inflatable bags in the seat may be arranged in groups to achieve a grouped control of multiple soft inflatable bags in the same region, so that the softness of the same region can be adjusted simultaneously to avoid unevenness of the seat surface caused by non-simultaneous adjustment. Moreover, the grouped adjustment can also reduce the number of solenoid valve modules used and reduce the control cost.

In a third aspect, an embodiment of the present disclosure provides a device for adjusting comfort of a seat. The device for adjusting comfort of a seat includes at least one soft inflatable bag that can be integrated in the seat. The soft inflatable bag is filled with a flexible filler. The soft inflatable bag is filled with gas. The soft inflatable bag is provided with a height limiting structure configured to limit the partial expansion height of the soft inflatable bag when inflated. The soft inflatable bag is further connected, via a connecting pipeline, with a shock absorption mechanism configured to release pressure from the soft inflatable bag when a suddenly changed squeezing force is exerted on the soft inflatable bag.

The device for adjusting comfort of a seat consists mainly of a soft inflatable bag. The soft inflatable bag is provided with a flexible filler. The flexible filler can avoid collapse and unevenness of the seat surface caused by excessive collapse of the bag body when gas is completely discharged from the soft inflatable bag. The soft inflatable bag is filled with gas. The soft inflatable bag is further connected with a shock absorption mechanism. Thus, when the soft inflatable bag is constantly subjected to repeated impact forces from pressure when a road is frequently bumpy, the pressure can be temporarily released by the shock absorption mechanism. A part of air is compressed into the shock absorption mechanism, so that the change in pressure of the soft inflatable bag is reduced, the change in softness is reduced, and the whole process is slowed down, thereby achieving the shock absorption effect and increasing the comfort of a human body when sitting in the seat. When the impact force exerted on the soft inflatable bag disappears, the pressure of the soft inflatable bag is reduced, and the shock absorption mechanism is restored to its original state, so that the pressure in the soft inflatable bag is restored, and the soft inflatable bag is restored to the original state of softness or hardness. This also avoids a loss of the pressure-bearing capacity of the soft inflatable bag caused by unreleasing of the pressure from the soft inflatable bag. The distance between the two upper and lower layers of the bag body of the soft inflatable bag can be restricted by the height limiting structure to avoid abnormal protrusion and deformation of the surface of the seat caused by bulging of the soft inflatable bag when inflated, so that the soft inflatable bag can follow the shape of the surface of the seat when it is inflated, thereby further improving the appearance and comfort of the surface of the seat.

Optionally, the soft inflatable bag is connected with at least one air path and at least one air source for inflating the soft inflatable bag through the air path. Gas is charged into or discharged from the soft inflatable bag through the air path to adjust the softness of a surface of the seat.

The soft inflatable bag is connected with an air source via an air path. The softness of each part of the surface of the seat can be adjusted by inflation and deflation of the soft inflatable bag to satisfy softness required by different occupants. Since this device is arranged independently, the supporting performance of the entire seat is not affected.

Optionally, the shock absorption mechanism includes at least one elastic sealed pocket. The connecting pipeline communicates a cavity of the elastic sealed pocket with a cavity of the soft inflatable bag.

Optionally, the shock absorption mechanism includes a cylinder. The cylinder has a first cavity and a second cavity. The connecting pipeline communicates the cavity of the soft inflatable bag and the first cavity with each other. The cylinder includes a piston having a protruding end fixedly connected to one end of a return spring. The other end of the return spring is connected to a fixed structure.

Optionally, the device for adjusting comfort of a seat further includes a flow adjustment mechanism configured to adjust a flow rate in the connecting pipeline.

Optionally, the flow adjustment mechanism includes a hoop sleeved around the connecting pipeline. The hoop includes an annular portion provided with an opening, and a first adjusting piece and a second adjusting piece extend in parallel outward from two movable ends of the annular portion, respectively. The first adjusting piece is provided with a threaded hole, and the second adjusting piece is provided with a smooth through hole corresponding to the threaded hole. A screw handle passing through the smooth through hole is threadedly fixed in the threaded hole.

Optionally, the device for adjusting comfort of a seat further includes a micromotor. The micromotor has an output shaft axially fixedly connected to the screw handle. The micromotor is controlled by a control module to rotate forward or reversely.

The control module is further configured to: control the rotation of the micromotor according to an input signal from an input module to increase or decrease the gas flow passing through the connecting pipeline.

Optionally, the height limiting structure is a penetrating-type height limiting strap and/or a built-in height limiting strap.

Optionally, the soft inflatable bag is provided with a number of air guide channels extending through the soft inflatable bag. The air guide channels are isolated from the cavity of the soft inflatable bag and configured to conduct the gas on both sides of the soft inflatable bag.

Air guide channels are provided in the soft inflatable bag, so that the seat can be integrated with ventilation and softness adjustment functions.

In a fourth aspect, an embodiment of the present disclosure provides a vehicle seat. The vehicle seat includes a backrest and/or a seat cushion and/or side wings into which the device for adjusting comfort of a seat described above is integrated. An air source of the vehicle seat is supplied by a micro air pump or by compressed air in the vehicle body.

Optionally, at least two layers of the soft inflatable bags are arranged in an adjacently stacked or spacedly stacked manner in a softness adjustment region of the vehicle seat. The softness adjustment region is a region in the vehicle seat in which the soft inflatable bags are arranged. The soft inflatable bags are located on a surface of a foam structure of the vehicle seat, and a flexible liner is laid outside the soft inflatable bags located on the surface.

The soft inflatable bags in the seat are arranged in multiple layers to achieve different softness adjustments, so that the softness of the seat can be adjusted within an increased range to meet more requirements in use.

Optionally, the foam structure of the vehicle seat is provided with a soft inflatable bag accommodating groove configured for placement of the soft inflatable bag.

Optionally, a covering body accommodating groove configured for placement of a covering body is provided in an open side of the soft inflatable bag accommodating groove. A trapezoidal structure is formed by the covering body accommodating groove and the soft inflatable bag accommodating groove.

The covering body accommodating groove and the soft inflatable bag accommodating groove being in a trapezoidal shape can accommodate a covering body and a soft inflatable bag, respectively. The trapezoidal structure facilitates corresponding placement by an operator, and the covering body may have a larger covering area than that of the soft inflatable bag. In this way, the covering body can completely cover the soft inflatable bag, and thus the covering body can completely shield the edge of the soft inflatable bag.

Optionally, a heating pad is arranged between a foam structure and a seat cover of the vehicle seat.

The ventilation and/or heating and softness adjustment functions are further integrated by providing a heating pad.

BRIEF DESCRIPTION OF THE DRAWINGS

Other features, objects, and advantages of the present disclosure will become more apparent by reading the detailed description of non-limiting embodiments with reference to the following drawings.

Figure 1:
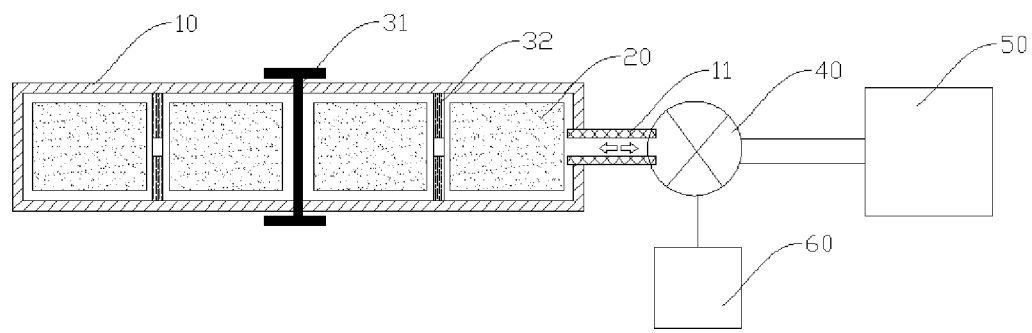
FIG. 1 is a schematic structural diagram of a first device for adjusting softness of a seat according to an embodiment of the present disclosure when viewed from a first perspective.

Reference Numerals in the Figures: 10, soft inflatable bag; 11, air path; 12, air guide channel; 13, first soft inflatable bag; 14, second soft inflatable bag; 15, third soft inflatable bag; 16, fourth soft Inflatable bag; 17, connecting pipeline; 20, flexible filler; 30, height limiting structure; 301, opening; 31, penetrating-type height limiting strap; 32, built-in height limiting strap; 40, solenoid valve module; 41, two-position two-way solenoid valve; 42, two-position three-way solenoid valve; 50, air source; 60, control module; 70, vehicle seat; 701, softness adjustment region; 70-1, ventilation hole; 71, backrest; 71-1, shoulder; 72, seat cushion; 73, side wing; 74, foam structure; 74-1, ventilation channel; 75, seat cover; 76, soft inflatable bag accommodating groove; 76-1. upper soft inflatable bag accommodating groove; 76-2, lower soft inflatable bag accommodating groove; 77, flexible liner; 78, support frame; 79, covering body accommodating groove; 80, driver or passenger; 90, covering body; 100, heating pad; 110, air guide structure; 120, shock absorption mechanism; 121, elastic sealed pocket; 122, cylinder; 123, first cavity; 124, second cavity; 125, piston; 126, return spring; 127, fixed structure; 130, flow adjustment mechanism; 132, hoop; 133, first adjusting piece; 1331, threaded hole; 134, second adjusting piece; 1341, smooth through hole; 135, screw handle; 136, annular portion; 140, micromotor; 150, input module.

DETAILED DESCRIPTION OF THE EMBODIMENTS

The present disclosure will be described in further detail below with reference to the accompanying drawings and embodiments. It will be understood that specific embodiments described here are only intended to explain a relevant invention, but not intended to limit the invention. In addition, it should be noted that only the parts related to the invention are shown in the drawings for ease of description.

It should be noted that similar reference numerals and letters refer to similar items in the following figures, and thus once an item is defined in one figure, it may not be further defined or explained in the following figures.

In the description of the present disclosure, it should be noted that the terms such as "center", "up", "down", "left", "right", "vertical", "horizontal", "inside", and "outside", if present, indicate the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure.

In addition, the terms such as "first", "second", and "third", if present, are used for distinguishing the description only, and should not be understood as an indication or implication of relative importance.

In the description of the present disclosure, it should also be noted that the terms "arranged", "mounted", "coupled", and "connected", if present, should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

The present disclosure will be described below in detail with reference to the accompanying drawings and in connection with embodiments.

Figure 2:
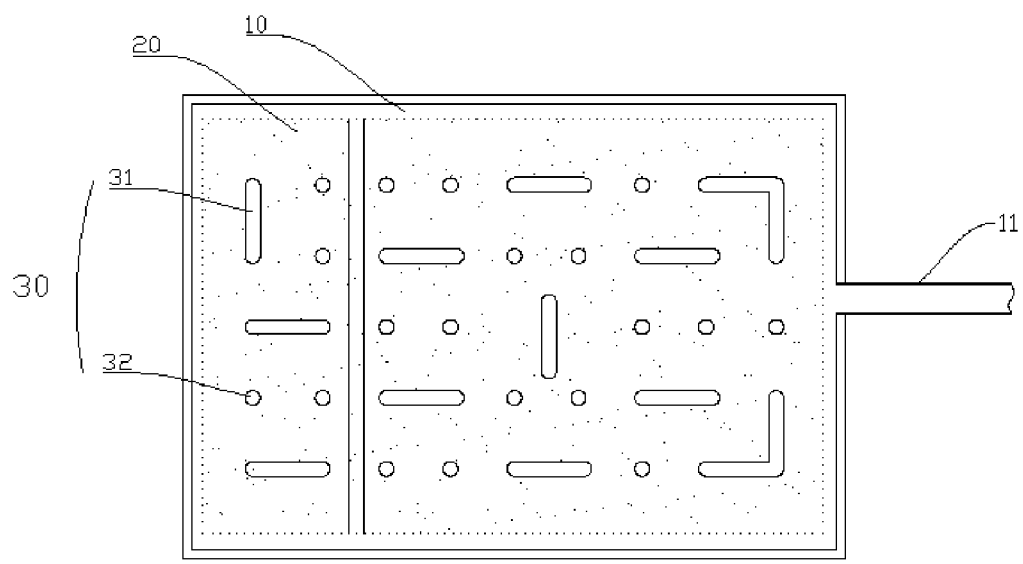
FIG. 2 is a schematic structural diagram of the first device for adjusting softness of a seat according to an embodiment of the present disclosure when viewed from a second perspective.

Referring to FIGS. 1 and 2, FIGS. 1 and 2 show a first device for adjusting softness of a seat according to this embodiment. The device has a soft inflatable bag 10 that can be integrated in the seat. The soft inflatable bag is connected with an air path 11. The soft inflatable bag 10 is filled with a flexible filler 20. Gas is discharged into or discharged from the soft inflatable bag 10 through the air path 11 to adjust the softness of the surface of the seat. The soft inflatable bag 10 is provided with a height limiting structure 30 configured to limit the expansion height of the soft inflatable bag 10 when inflated.

Figure 28:
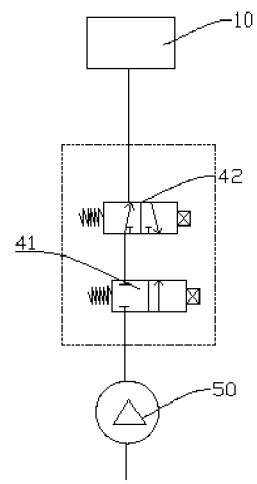
FIG. 28 is a schematic structural diagram of a solenoid valve module in the second device for adjusting comfort of a seat according to an embodiment of the present disclosure.

Here, the air path 11 generally refers to an air path structure that supplies an air source 50 to the soft inflatable bag 10. For example, the air path 11 includes an air nozzle fixed to the soft inflatable bag 10, and an air pipe fixedly connected to the air nozzle. The air pipe has an end connected to an air outlet of a solenoid valve module 40, and an air inlet of the solenoid valve module 40 is connected with an air source 50. The solenoid valve module 40 includes, as shown in FIG. 28, for example, a two-position two-way solenoid valve 41 and a two-position three-way solenoid valve 42 connected in series. In other words, the air inlet of the two-position two-way solenoid valve 41 serves as the air inlet of the entire solenoid valve module 40, and the air outlet of the two-position two-way solenoid valve 41 communicates with the air inlet of the two-position three-way solenoid valve 42. The air outlet of the two-position three-way solenoid valve 42 is connected to the air pipe and the soft inflatable bag 10, and the deflation port of the two-position three-way solenoid valve 42 serves as the deflation port of the entire solenoid valve module 40. When only the two-position two-way solenoid valve 41 is energized, the soft inflatable bag 10 is inflated. When only the two-position three-way solenoid valve 42 is energized, the soft inflatable bag 10 is deflated. When neither of the solenoid valves is energized, the soft inflatable bag 10 is in a state of maintaining pressure. The energization and de-energization of the solenoid valve module 40 are controlled by a control module 60. The control module 60 may be, for example, a control circuit consisting of a single-chip microcomputer as a core processor. When the air source 50 is an air pump, the air pump and the solenoid valve module 40 may be integrated in one piece, and the control module 60 may be a control circuit in the integrated component.

In other embodiments, the solenoid valve module 40 may be replaced by a manual valve. In this case, the manual valve includes a pressing airbag. The pressing airbag has an air outlet provided with an air discharging one-way valve, and an air inlet provided with an air feeding one-way valve. When the pressing airbag is manually squeezed, the pressure in the pressing airbag increases, and the air discharging one-way valve is opened so that the soft inflatable bag 10 is inflated. When the pressing airbag is released, the pressure in the pressing airbag is decreased, and external air is fed into the pressing airbag through the air feeding one-way valve. In this way, the soft inflatable bag 10 can be inflated by repeating the operation for the pressing airbag.

In this embodiment, one soft inflatable bag 10 is provided with one air path 11. In other embodiments, one soft inflatable bag 10 may be provided with a plurality of air paths 11, so that each portion of the soft inflatable bag 10 has uniform softness or hardness. Of course, the device may include a plurality of soft inflatable bags 10.

Here, the flexible filler 20 may optionally be a flexible material such as sponge or foam.

Here, with reference to FIG. 2, in this embodiment, the height limiting structure 30 includes penetrating-type height limiting straps 31 and/or built-in height limiting straps 32 arranged in a distributed manner. The cross sections of the penetrating-type height limiting strap 31 and the built-in height limiting strap 32 may be in a variety of shapes such as a dot shape, a strip shape, a circular shape, or a honeycomb shape.

The penetrating-type height limiting strap 31 has an I-shaped vertical section. It has two ends protruding beyond the soft inflatable bag 10, and has a vertical portion slightly longer than the normal height of the soft inflatable bag 10 when deflated. When the soft inflatable bag 10 is being inflated, its ends protruding beyond the soft inflatable bag 10 can exert pressure on the surface of the soft inflatable bag 10 to avoid excessive expansion of the soft inflatable bag at a single point.

Figure 16:
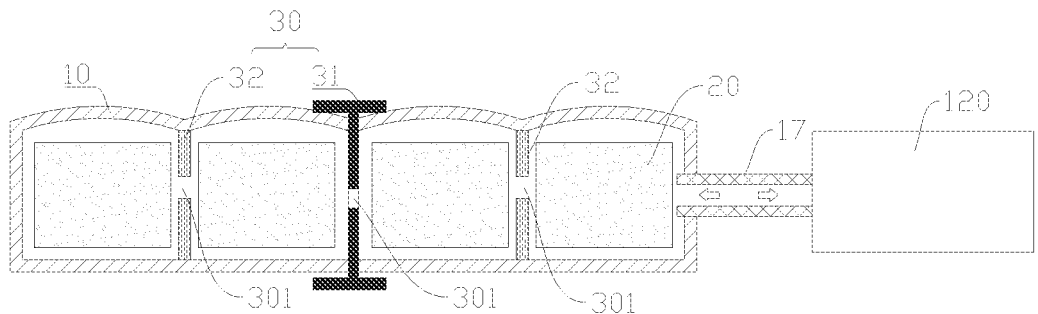
FIG. 16 is a schematic structural diagram of a first device for adjusting comfort of a seat according to an embodiment of the present disclosure when viewed from a first perspective.

In an optional embodiment, the height limiting structure 30 is provided with an opening 301 (shown in FIG. 16). Specifically, openings 301 are provided in the middle of the penetrating-type height limiting strap 31 and the built-in height limiting strap 32 and configured to conduct the gas on both sides of the penetrating-type height limiting strap 31 and the built-in height limiting strap 32. The openings 301 are provided to facilitate the circulation of the gas in the soft inflatable bag 10.

Each of the penetrating-type height limiting strap 31 and the built-in height limiting strap 32 is made of a flexible material that may be selected from nylon, a polyester film, a braided strap, woven fabric, a non-woven material, a soft plastic breathable film, a perforated plastic sheet, or the like.

Since the penetrating-type height limiting strap 31 penetrates through the bag body of the soft inflatable bag 10, sealing rings are arranged or sealants are applied between the ends thereof protruding beyond the soft inflatable bag 10 and adjacent surfaces of the soft inflatable bag 10, or the ends are welded to the bag body to prevent escape of the gas from the penetrated portions, in order to ensure the airtightness of the penetrated portions during inflation.

The two ends of the built-in height limiting strap 32 are fixed to the upper and lower surfaces in the soft inflatable bag 10, respectively. The two ends of the built-in height limiting strap 32 may be optionally fixed in the soft inflatable bag by means of: ultrasonic welding, gluing, riveting, threading connection, or the like.

In any way described above, the built-in height limiting strap 32 limits the height of swelling of the soft inflatable bag 10 at this position by tightening the upper and lower portions inside the bag body of the soft inflatable bag 10.

The height limiting structure 30 may consist of the penetrating-type height limiting straps 31 or the built-in height limiting straps 32 alone, or consist of both the penetrating-type height limiting straps 31 and the built-in height limiting straps 32 as shown in FIG. 2. In either way, the uniformly distributed height limiting structures 30 in this embodiment allow the swelling shape of each portion of the soft inflatable bag 10 when inflated to be consistent with the shape of the foam structure of the vehicle seat and be also consistent with its shape when deflated. In other words, the shape of the soft inflatable bag is conformable to the original state of the surface of the seat, so that a good appearance and comfort of the surface of the seat are ensured during inflation. Moreover, the contact area between an occupant and a region of the surface of the seat corresponding to the soft inflatable bag 10 is increased to improve the stability. Furthermore, the gas can flow freely in the soft inflatable bag 10 without being isolated by the height limiting structures 30.

Figure 3:
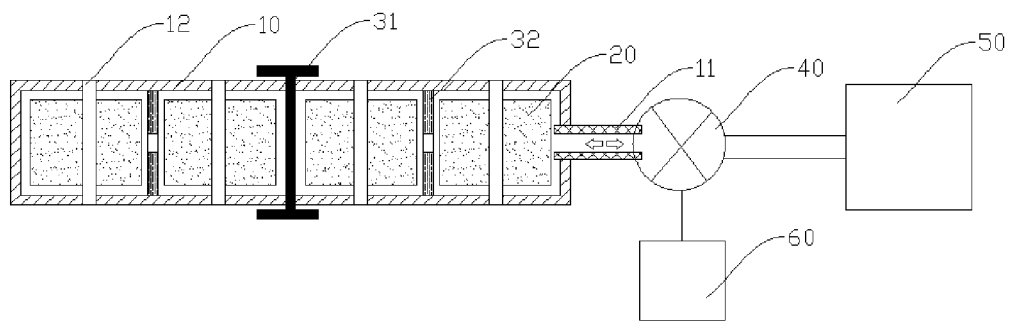
FIG. 3 is a schematic structural diagram of a second device for adjusting softness of a seat according to an embodiment of the present disclosure when viewed from a first perspective.
Figure 4:
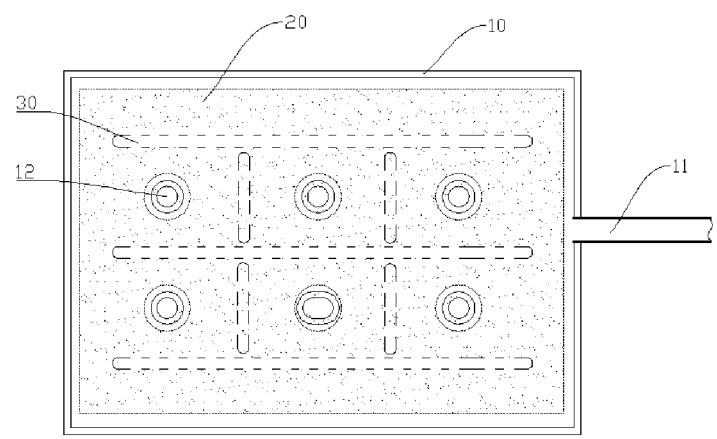
FIG. 4 is a schematic structural diagram of the second device for adjusting softness of a seat according to an embodiment of the present disclosure when viewed from a second perspective.

Referring to FIGS. 3 and 4, FIGS. 3 and 4 show a second device for adjusting softness of a seat according to this embodiment. The second device for adjusting softness of a seat has substantially the same structure as that of the first device for adjusting softness of a seat, except that this soft inflatable bag 10 is provided with a number of air guide channels 12 configured to conduct airflow on both sides of the soft inflatable bag 10. The air guide channels 12 are isolated from an inflatable cavity of the soft inflatable bag 10. The inflatable cavity of the soft inflatable bag 10 is a cavity filled with a flexible filler 20, namely, a cavity configured to contain a charged gas.

The second device for adjusting softness of a seat according to this embodiment is applicable to a vehicle seat with ventilation performance. Wind (or airflow) directed from the bottom of the seat to the surface of the seat may be blown out from the air guide channels 12 and finally blown to a human body through the seat surface. The arrangement of the air guide channels 12 in the second device for adjusting softness of a seat in this embodiment further improves the applicability of the device.

Similarly, the second device for adjusting softness of a seat according to this embodiment is also suitable for the ventilation of the suction-type seat.

Figure 5:
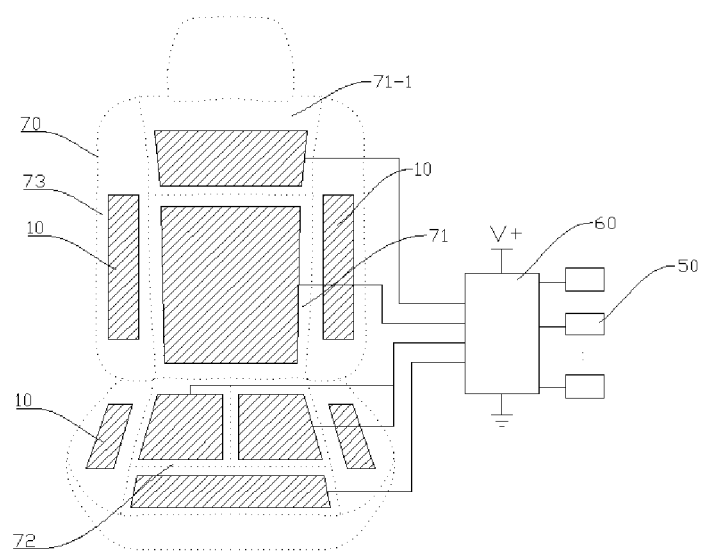
FIG. 5 is a schematic structural diagram of a first vehicle seat according to an embodiment of the present disclosure.
Figure 6:
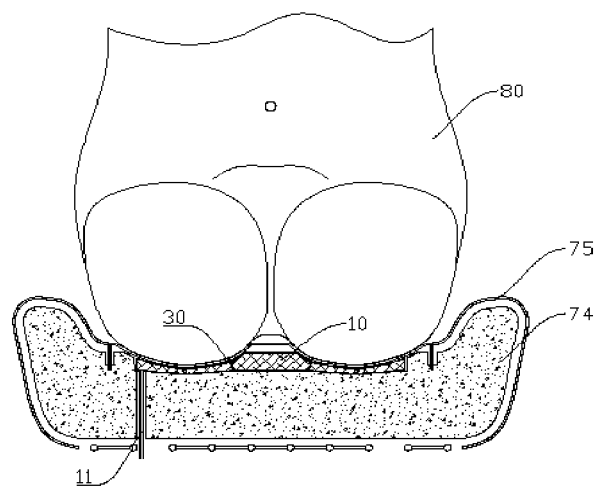
FIG. 6 is a schematic structural diagram of the first vehicle seat with lower hardness according to an embodiment of the present disclosure.
Figure 7:
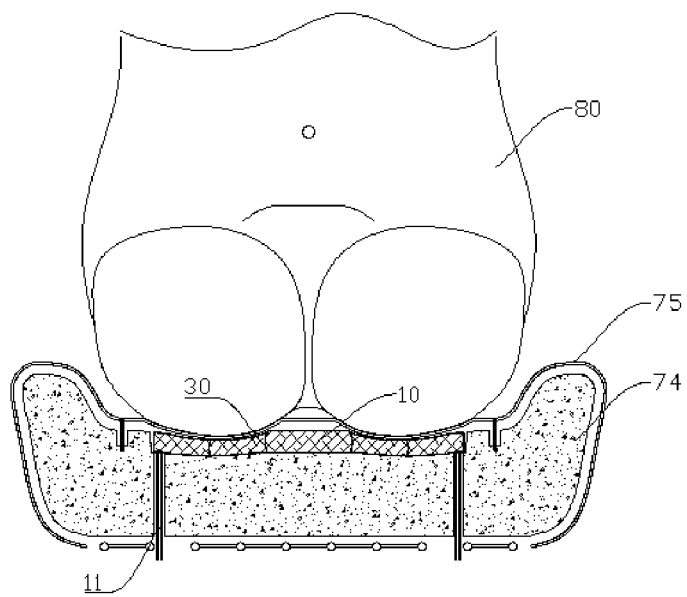
FIG. 7 is a schematic structural diagram of the first vehicle seat with higher hardness according to an embodiment of the present disclosure.

Referring to FIGS. 5-7, FIGS. 5-7 show a first vehicle seat 70 according to this embodiment. The first devices for adjusting softness of a seat according to this embodiment are integrated into a backrest 71, a seat cushion 72, and side wings 73 of the vehicle seat 70. In other embodiments, the device for adjusting softness of a seat may be arranged in any one or more of the backrest 71, the seat cushion 72, and the side wings 73 of the vehicle seat.

In this embodiment, the air source of the soft inflatable bag 10 may optionally be supplied by either of:
1. a separately arranged micro air pump; and
2. compressed air in the vehicle body.

The seat cushion 72 of the vehicle seat 70 is taken as an example. The soft inflatable bag 10 is mounted between a seat cover 75 and a foam structure 74 of the seat cushion 72. The air path 11 of the soft inflatable bag 10 extends from the bottom through the foam structure 74 and is connected to the air source 50.

In this embodiment, solenoid valve modules 40 are mounted in the air paths 11 of the soft inflatable bags 10 arranged at the individual parts of the vehicle seat 70, respectively. A control module 60 of the vehicle seat 70 controls the inflation and deflation of each of the soft inflatable bags 10 independently of one another by controlling ON and OFF of each of the solenoid valve modules 40. The independent control of each of the soft inflatable bags 10 allows each of the soft inflatable bags 10 to be inflated and deflated independently, so that the individual soft inflatable bags 10 can form different inflated and deflated combinations to achieve the adjustment of multiple functions and different hardness.

Optionally, in other embodiments, all the soft inflatable bags 10 in the vehicle seat are arranged in groups, and the air paths 11 of each group of soft inflatable bags 10 converge on a branch air path in which a branch solenoid valve module is mounted. The control module 60 controls the inflation and deflation of each group of soft inflatable bags 10 by controlling ON and OFF of each group of branch solenoid valve module.

The soft inflatable bags 10 may be grouped based on a rule set according to the position regions or actual use requirements or control requirements. For example, when the soft inflatable bags are grouped by region, the air paths 11 of all the soft inflatable bags 10 located in the side wings 73 are arranged in parallel and connected to a common branch air path. All the soft inflatable bags 10 in the seat cushion 72 are arranged in parallel and connected to a common branch air path. All the soft inflatable bags 10 in the backrest 71 are arranged in parallel and connected to a common branch air path. The soft inflatable bags 10 arranged in groups can be controlled wholly, so that the soft inflatable bags in the same region act synchronously.

The seat cushion 72 part of the vehicle seat 70 is taken as an example. A driver or passenger 80 is sitting in a seat equipped with a soft inflatable bag 10. When the soft inflatable bag 10 is in an unfilled state, the height limiting structures 30 are bent and collapsed. The soft inflatable bag 10 and the flexible filler therein are compressed, so that the surface of the seat is in a relatively soft state, and the torso of the human body sinks deeper into the seat surface as shown in FIG. 6. When the driver or passenger 80 is sitting on the seat surface and the soft inflatable bag 10 is in a filled state, the height limiting structures 30 are relatively stretched. The soft inflatable bag 10 and the flexible filler 20 therein are only slightly compressed, so that the surface of the seat is in a relatively hard state, and the torso of the human body sinks shallowly into the seat surface as shown in FIG. 7. Therefore, the solution of this embodiment provides a seat with adjustable different softness.

Figure 8:
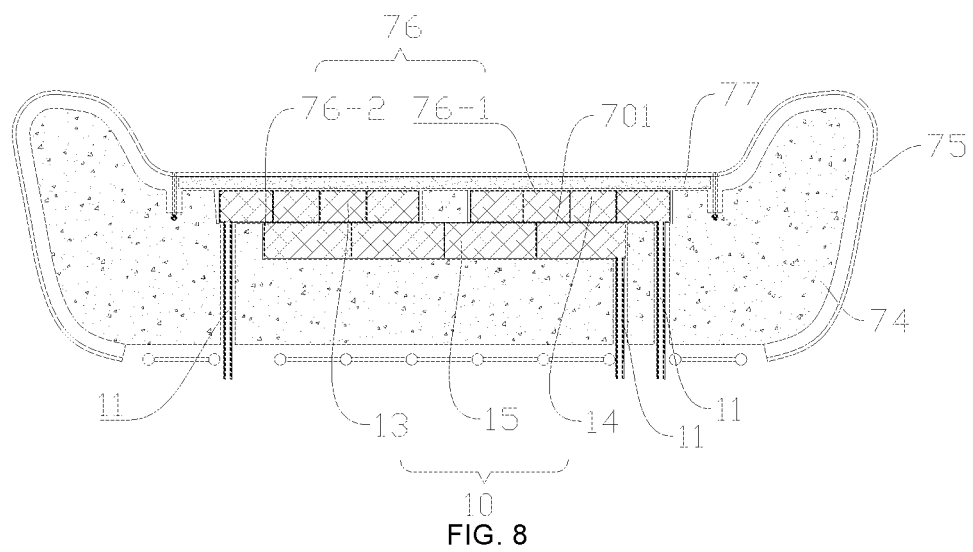
FIG. 8 is a schematic structural diagram of a second vehicle seat provided with multiple layers of soft inflatable bags according to an embodiment of the present disclosure.
Figure 9:
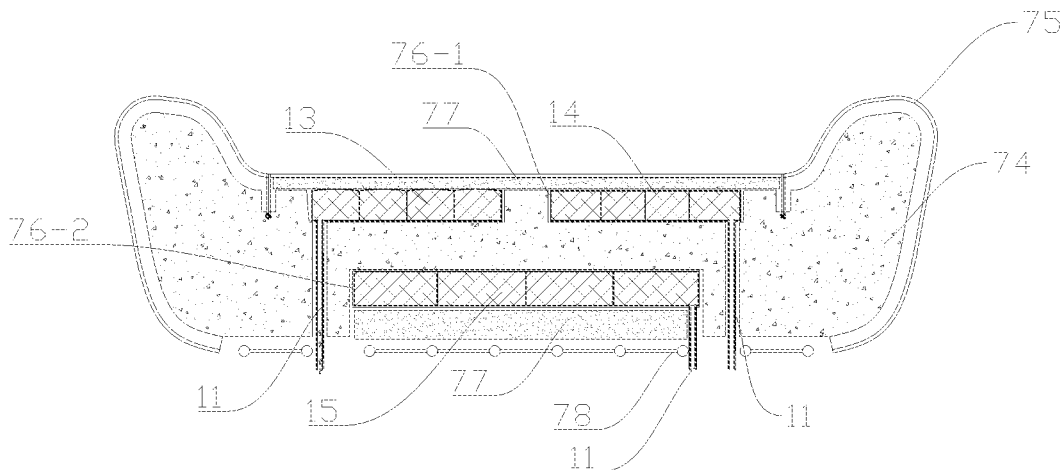
FIG. 9 is a schematic structural diagram of a third vehicle seat provided with multiple layers of soft inflatable bags according to an embodiment of the present disclosure.
Figure 10:
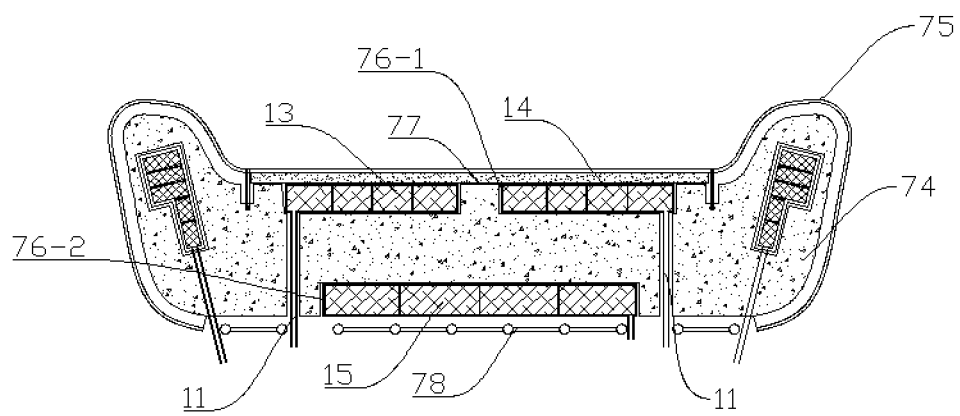
FIG. 10 is a schematic structural diagram of a fourth vehicle seat provided with multiple layers of soft inflatable bags according to an embodiment of the present disclosure.

Referring to FIGS. 8 to 10, FIGS. 8 to 10 show second, third, and fourth vehicle seats 70 according to this embodiment, which are modified on the basis of the first device for adjusting softness of a seat. Specifically, multiple layers of soft inflatable bags 10 are arranged in a stacked manner in a softness adjustment region 701 of the vehicle seat 70. This embodiment is described by taking two layers of soft inflatable bags 10 as an example.

The two layers of soft inflatable bags 10 may be specifically arranged in either of the following manners.

1. Adjacent Stacking. As shown in FIG. 8, soft inflatable bag accommodating grooves 76 configured for placement of the soft inflatable bags 10 are provided in a side of the foam structure 74 of the seat adjacent to the seat cover 75. There are three soft inflatable bag accommodating grooves 76, namely, two symmetrically arranged upper soft inflatable bag accommodating grooves 76-1 and one lower soft inflatable bag accommodating groove 76-2. A first soft inflatable bag 13 and a second soft inflatable bag 14 are arranged side by side in the two upper soft inflatable bag accommodating grooves 76-1. A third soft inflatable bag 15 is arranged in the lower soft inflatable bag accommodating groove 76-2.

Here, the first soft inflatable bag 13 and the second soft inflatable bag 14 are simultaneously controlled to be inflated or deflated, and a flexible liner 77 is arranged between the first and second soft inflatable bags 13 and 14 and the seat cover 75. Partial slight swelling occurs around the height limiting structures 30, resulting in a slightly uneven state. The flexible liner 77 can compensate for this state to enhance the comfort and flatness of the surface of the seat. When only the first soft inflatable bag 13 and the second soft inflatable bag 14 in the upper soft inflatable bag accommodating grooves 76-1 are inflated, or only the third soft inflatable bag 15 is inflated, moderate hardness can be provided to the seat cushion of the seat. When the first soft inflatable bag 13, the second soft inflatable bag 14, and the third soft inflatable bag 15 are inflated at the same time, higher hardness can be provided to the seat cushion of the seat. When only the third soft inflatable bag 15 is inflated, because the occupant does not come in direct contact with this soft inflatable bag 10, the hardness is adjusted with a certain cushioning distance from the third soft inflatable bag 15 to the occupant, which further improves the comfort in adjusting the hardness.

2. Spaced Stacking. As shown in FIG. 9, the two layers of soft inflatable bags 10 are located on a side close to the seat cover 75 and a side remote from the seat cover 75, respectively. Because the third soft inflatable bag 15 at the bottom is in direct contact with a support frame 78 of the vehicle seat 70, a flexible liner 77 is also arranged between the third soft inflatable bag 15 and the support frame 78 in order to protect the third soft inflatable bag 15. Of course, if the bag body of the third soft inflatable bag 15 is made of a relatively strong material, its bottom may not be provided with a flexible liner 77 as shown in FIG. 10.

Figure 11:
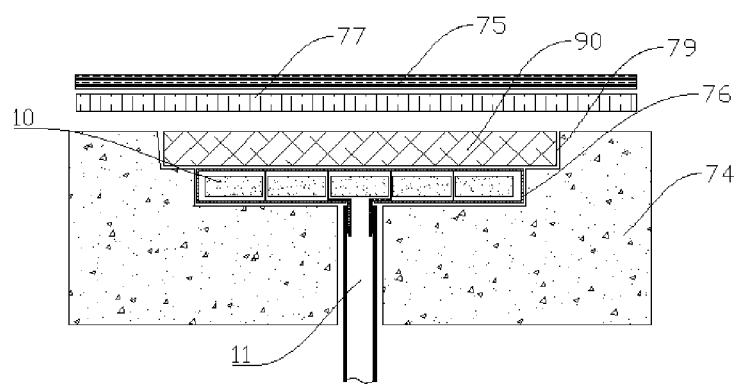
FIG. 11 is a schematic structural diagram of a fifth vehicle seat provided with a covering body accommodating groove according to an embodiment of the present disclosure.

Referring to FIG. 11, FIG. 11 shows a fifth vehicle seat according to this embodiment, which is modified on the basis of the first vehicle seat 70 according to this embodiment. As shown in FIG. 11, the foam structure 74 is further provided with a covering body accommodating groove 79 configured for placement of a covering body 90, on a side of the soft inflatable bag accommodating groove 76 close to the seat cover 75. A trapezoidal structure is formed by the covering body accommodating groove 79 and the soft inflatable bag accommodating groove 76. When the soft inflatable bag 10 is inflated, partial slight swelling occurs around the height limiting structures 30, resulting in a slightly uneven state. The covering body 90 can compensate for this state to enhance the comfort and flatness of the surface of the seat.

The covering body accommodating groove 79 is wider than the soft inflatable bag accommodating groove 76 and can fully cover the edge of the soft inflatable bag 10 to protect the soft inflatable bag 10.

The covering body 90 and the flexible liner 77 described above may be made of the same material. For example, both are made of a flexible material such as non-woven fabric, non-woven felt, foam or sponge pad.

Figure 12:
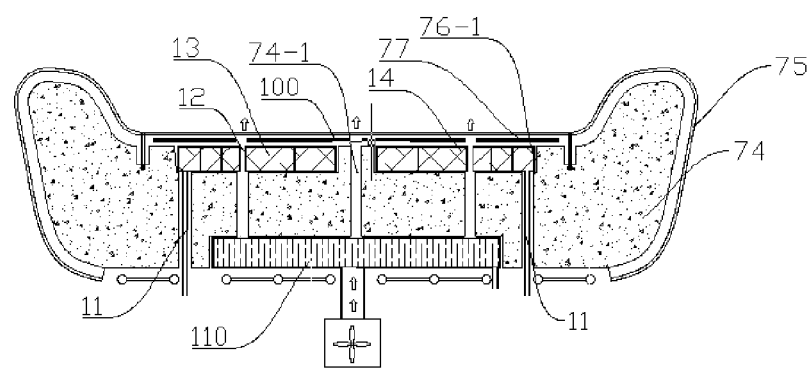
FIG. 12 is a schematic structural diagram of a sixth vehicle seat according to an embodiment of the present disclosure when viewed from a first perspective.

Referring to FIGS. 12 to 15, FIGS. 12 to 15 show a sixth vehicle seat 70 according to this embodiment, which is modified on the basis of the first vehicle seat 70 by replacing the structure of the soft inflatable bag 10 with the soft inflatable bag structure in the second device for adjusting softness of a seat. As shown in FIG. 12, in this case, a heating pad 100 is further arranged between the soft inflatable bag 10 and the seat cover 75. The vehicle seat 70 has a ventilation structure. The ventilation structure includes an air guide structure 110 arranged at the bottom of the vehicle seat 70. The foam structure 74 is provided therein with a ventilation channel 74-1. An air flow directed from the air guide structure 110 flows out from the ventilation channel 74-1 and then circulates to a side of the seat, on which the seat cover 75 is arranged, through the air guide channels 12 of the soft inflatable bag 10.

Figure 13:
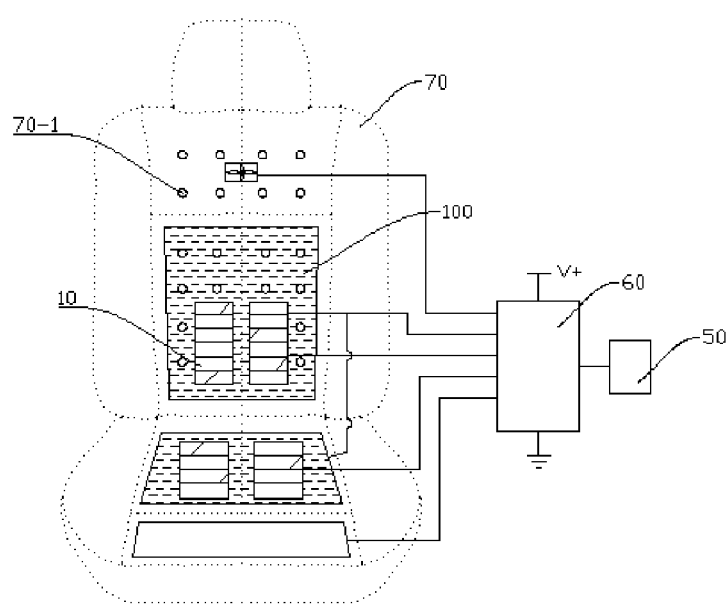
FIG. 13 is a schematic structural diagram of the sixth vehicle seat according to an embodiment of the present disclosure when viewed from a second perspective.

As shown in FIG. 13, the vehicle seat 70 is integrated with the functions of heating, ventilation, and softness adjustment. The backrest 71 and the seat cushion 72 of the vehicle seat 70 are provided with heating pads 100. More functions are achieved. The arrangement of ventilation holes 70-1 may be added as required. When there are ventilation, softness adjustment, and heating functions, the substrate of the heating pad may be selected from a substrate with good air permeability, or the heating pad may be provided with an opening. The heating, ventilation, and softness adjustment can be integrated into one control module for control and adjustment to reduce cost.

Figure 14:
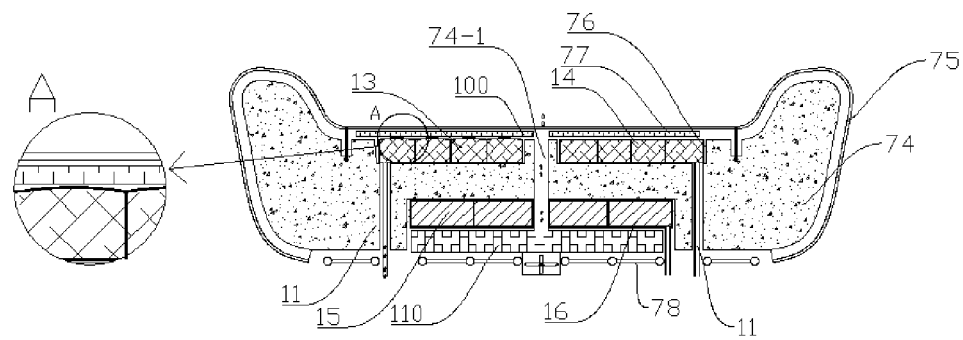
FIG. 14 is a schematic structural diagram of the sixth vehicle seat according to an embodiment of the present disclosure when viewed from a third perspective.

Optionally, as shown in FIG. 14, the adjustment of softness in FIG. 14 may also be implemented by multi-leveled adjustment corresponding to FIGS. 8 to 10. It can be seen, with reference to FIG. 14, that in order to match the vehicle seat 70 with a ventilation structure, multiple soft inflatable bags 10 spaced from each other may be arranged on the same layer, and a ventilation channel 74-1 leading to the direction of the seat cover 75 may be provided in the foam structure 74 between the soft inflatable bags 10. Positions for the ventilation channel 74-1 are reserved between the first soft inflatable bag 13 and the second soft inflatable bag 14 arranged side by side on the upper part, and between the third soft inflatable bag 15 and the fourth soft inflatable bag 16 arranged side by side at the lower part. It can be seen from the enlarged view of part A of the figure that when the soft inflatable bag 10 is inflated, a partial swelling state occurs around the height limiting structures 30. The flexible liner 77 can just compensate for this state to enhance the comfort and flatness of the surface of the seat.

Figure 15:
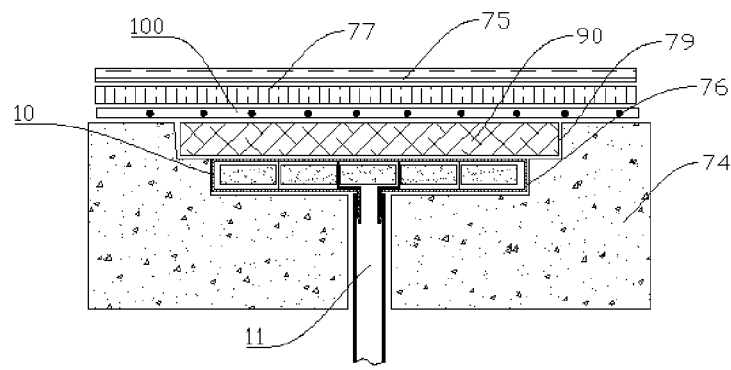
FIG. 15 is a schematic structural diagram of the sixth vehicle seat according to an embodiment of the present disclosure when viewed from a fourth perspective.

Optionally, as shown in FIG. 15, the vehicle seat 70 in FIG. 15 may also be provided with a covering body accommodating groove 79 configured for placement of a covering body 90 above the soft inflatable bag accommodating groove 76, corresponding to FIG. 11.

Referring to FIG. 16, FIG. 16 shows a first device for adjusting comfort of a seat according to this embodiment. The device includes at least one soft inflatable bag 10 that can be integrated in the seat. The soft inflatable bag 10 is filled with a flexible filler 20. The soft inflatable bag 10 is filled with gas. The soft inflatable bag 10 is further connected, via a connecting pipeline 17, with a shock absorption mechanism 120 configured to release pressure from the soft inflatable bag 10 when a suddenly changed squeezing force is exerted on the soft inflatable bag 10.

The soft inflatable bag 10 in this embodiment is shown in FIG. 16. Its cavity (i.e., inflatable cavity) is filled with air pressure. The air pressure inside the soft inflatable bag is generally greater than the outside atmospheric pressure, so that the soft inflatable bag 10 has a certain degree of hardness.

The shock absorption mechanism 120 may be optionally implemented in either of the following manners.

Figure 17:
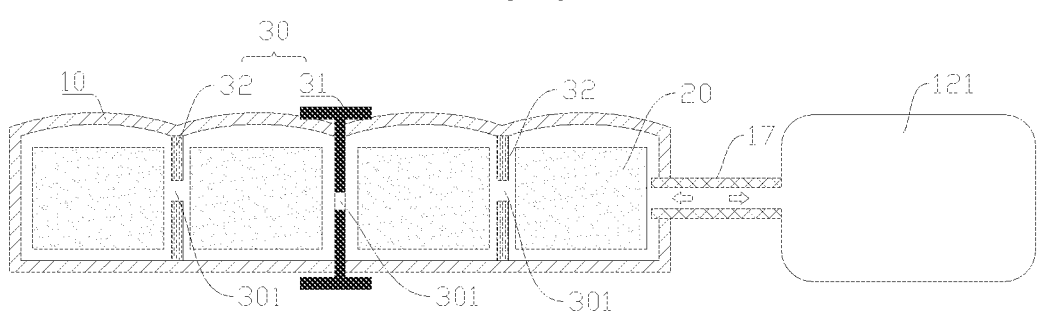
FIG. 17 is a schematic structural diagram of the first device for adjusting comfort of a seat according to an embodiment of the present disclosure when viewed from a second perspective.

1. As shown in FIG. 17, the shock absorption mechanism 120 includes at least one elastic sealed pocket 121. The connecting pipeline 17 communicates the cavity of the elastic sealed pocket 121 with the cavity of the soft inflatable bag 10. Because the soft inflatable bag 10 has been pre-filled with gas, the cavity in the soft inflatable bag 10 communicates with the cavity of the elastic sealed pocket 121 to form a complete sealed cavity.

Figure 18:
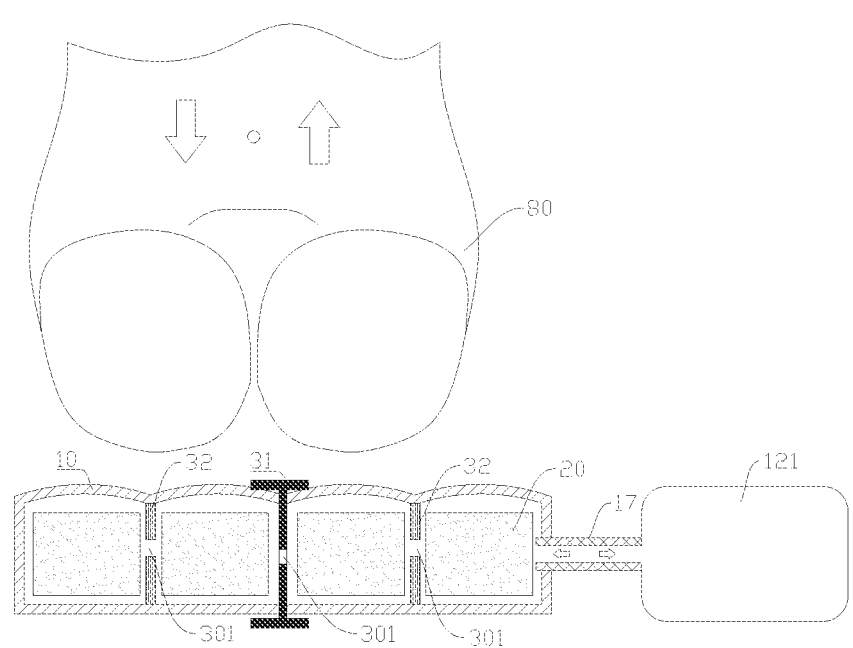
FIG. 18 is a schematic structural diagram of the first device for adjusting comfort of a seat according to an embodiment of the present disclosure when viewed from a third perspective.

When a road is frequently bumpy, a general sealed air bag is constantly subjected to repeated impact forces from the pressure, and its internal pressure cannot be released therefrom, which will cause a loss of the pressure-bearing capacity of the sealed air bag. In addition, the sealed air bag will be suddenly pressurized to become hard or suddenly become soft when repeated impact is applied thereto. Sudden changes in hardness will cause a human body to feel uncomfortable bump and vibration. In contrast, the soft inflatable bag 10 in this embodiment is connected with a shock absorption mechanism 120, which will slow down this process. The elastic sealed pocket 121 in this embodiment is made of a deformable elastomer. As shown in FIG. 18, when the pressure of part of the gas in the soft inflatable bag 10 is greater than the deformable force, the gas enters the inside of the elastic sealed pocket 121, and the volume of the pocket body increases. When the impact force disappears, the deformation of the soft inflatable bag 10 disappears, and the contraction force of the elastic sealed pocket 121 is greater than the pressure of the soft inflatable bag 10, so that the elastic sealed pocket 121 is reduced in volume and restored to the original state. The gas is compressed back to the soft inflatable bag 10, and the soft inflatable bag 10 is restored to the original softness. Therefore, when the vehicle seat is being jounced, the elastic sealed pocket 121 releases air pressure from or restores air pressure to the soft inflatable bag in time according to a change of the pressure in the soft inflatable bag 10, thereby reducing the amount and speed of the sudden change of the air pressure in the soft inflatable bag 10 to increase the comfort of a human body sitting in the seat.

In this embodiment, the elastic sealed pocket 121 may be, for example, made of rubber or silicone rubber.

Figure 19:
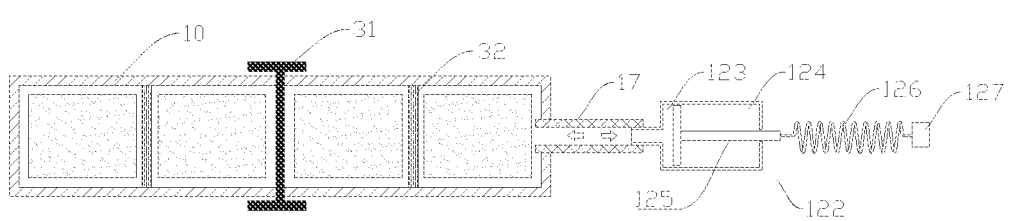
FIG. 19 is a schematic structural diagram of the first device for adjusting comfort of a seat according to an embodiment of the present disclosure when viewed from a fourth perspective.

2. As shown in FIG. 19, the shock absorption mechanism 120 includes a cylinder 122. The cylinder 122 has a first cavity 123 and a second cavity 124. The connecting pipeline 17 communicates the cavity of the soft inflatable bag 10 and the first cavity 123 with each other. The cylinder 122 includes a piston 125 having a protruding end fixedly connected to one end of a return spring 126. The other end of the return spring 126 is connected to a fixed structure 127. The fixed structure may be, for example, a fixed structure in the seat, such as a seat frame.

Figure 20:
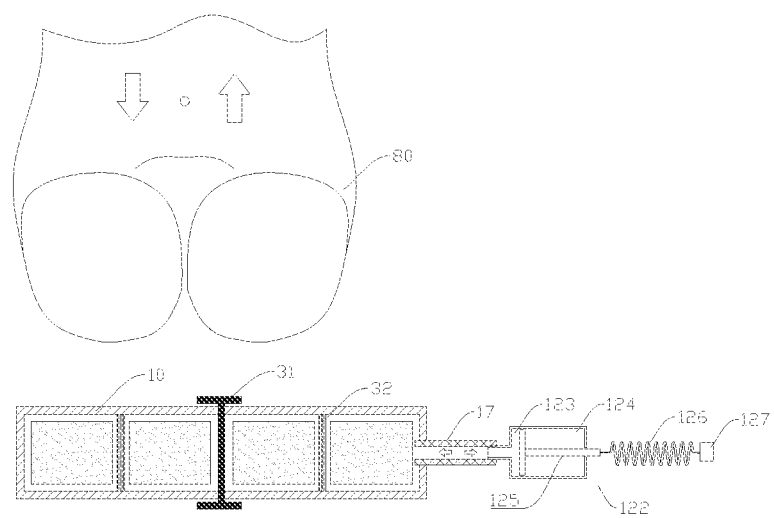
FIG. 20 is a schematic structural diagram of the first device for adjusting comfort of a seat according to an embodiment of the present disclosure when viewed from a fifth perspective.

When there is a sudden increase in pressure, as shown in FIG. 20, air in the soft inflatable bag 10 will be partially compressed into the first cavity 123. The sudden increase in pressure in the first cavity 123 will push the piston 125 to move toward the direction of the second cavity 124, and the return spring 126 is squeezed, so that the change in pressure of the soft inflatable bag 10 is reduced to reduce the change in softness. In this way, the whole process is slowed down, thereby increasing the comfort of a human body sitting in the seat.

Moreover, when the impact force disappears, the pressure of the soft inflatable bag 10 decreases. The piston 125 is moved toward the direction of the first cavity 123 under the action of the restoring force of the return spring 126. Thus, the gas in the first cavity 123 is squeezed by the piston 125 and flows back into the soft inflatable bag 10 until the return spring 126 is restored to its original state, and the soft inflatable bag 10 is restored to the original state of softness.

Only two examples of the shock absorption mechanism 120 are described above, and other feasible solutions with similar functions may also be used.

In this embodiment, the flexible filler 20 may optionally be a flexible material such as sponge or foam.

Here, in this embodiment, as shown in FIGS. 16 to 21, the soft inflatable bag 10 is provided with a height limiting structure 30 configured to limit the partial expansion height of the soft inflatable bag 10 when inflated. The height limiting structure 30 includes penetrating-type height limiting straps 31 and/or built-in height limiting straps 32 arranged in a distributed manner. The cross sections of the penetrating-type height limiting strap 31 and the built-in height limiting strap 32 may be in a variety of shapes such as a dot shape, a strip shape, a circular shape, or a honeycomb shape.

The penetrating-type height limiting strap 31 has an I-shaped vertical section. It has two ends protruding beyond the soft inflatable bag 10, and has a vertical portion slightly longer than the normal height of the soft inflatable bag 10 when deflated. When the soft inflatable bag 10 is being inflated, its ends protruding beyond the soft inflatable bag 10 can exert pressure on the surface of the soft inflatable bag 10 to avoid excessive expansion of the soft inflatable bag at a single point.

In an optional embodiment, the height limiting structure 30 is provided with an opening 301. With reference to FIG. 16, specifically, the openings 301 are provided in the middle of the penetrating-type height limiting strap 31 and the built-in height limiting strap 32. In other words, an opening 301 is provided in the penetrating-type height limiting strap 31, and an opening 301 is provided in the built-in height limiting strap 32. The openings are configured to conduct the gas on both sides of the penetrating-type height limiting strap 31 and the built-in height limiting strap 32, respectively. The openings 301 are provided to facilitate the circulation of the gas in the soft inflatable bag 10.

Each of the penetrating-type height limiting strap 31 and the built-in height limiting strap 32 is made of a flexible material that may be selected from nylon, a polyester film, a braided strap, woven fabric, a non-woven material, a soft plastic breathable film, a perforated plastic sheet, or the like.

Since the penetrating-type height limiting strap 31 penetrates through the bag body of the soft inflatable bag 10, sealing rings are arranged or sealants are applied between the ends thereof protruding beyond the soft inflatable bag 10 and adjacent surfaces of the soft inflatable bag 10, or the ends are welded to the bag body to prevent escape of the gas from the penetrated portions, in order to ensure the airtightness of the penetrated portions during inflation.

The two ends of the built-in height limiting strap 32 are fixed to the upper and lower surfaces in the soft inflatable bag 10, respectively. The two ends of the built-in height limiting strap 32 may be optionally fixed in the soft inflatable bag by means of: ultrasonic welding, gluing, riveting, threading connection, or the like.

In any way described above, the built-in height limiting strap 32 limits the height of swelling of the soft inflatable bag 10 at this position by tightening the upper and lower portions inside the bag body of the soft inflatable bag 10.

The height limiting structure 30 may consist of the penetrating-type height limiting straps 31 or the built-in height limiting straps 32 alone, or consist of both the penetrating-type height limiting straps 31 and the built-in height limiting straps 32. In either way, the uniformly distributed height limiting structures 30 in this embodiment allow the swelling shape of each portion of the soft inflatable bag 10 when inflated to be consistent with the shape of the foam structure of the vehicle seat and be also consistent with its shape when deflated. In other words, the shape of the soft inflatable bag is conformable to the original state of the surface of the seat, so that a good appearance and comfort of the surface of the seat are ensured during inflation. Moreover, the contact area between an occupant and a region of the surface of the seat corresponding to the soft inflatable bag 10 is increased to improve the stability. Furthermore, the gas can flow freely in the soft inflatable bag 10 without being isolated by the height limiting structures 30.

Figure 22:
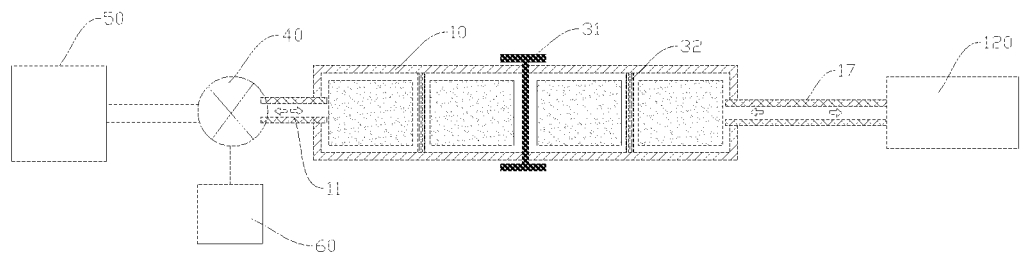
FIG. 22 is a schematic structural diagram of a second device for adjusting comfort of a seat according to an embodiment of the present disclosure when viewed from a first perspective.

Referring to FIGS. 22-27, FIGS. 22-27 shows a second device for adjusting comfort of a seat according to this embodiment, as shown in FIG. 22, which is modified on the basis of the first device for adjusting comfort of a seat. In FIG. 22, the soft inflatable bag 10 is connected with at least one air path 11 and at least one air source 50 for inflating the soft inflatable bag 10 through the air path 11. Gas is charged into or discharged from the soft inflatable bag 10 through the air path 11 to adjust the softness of the surface of the seat.

Figure 23:
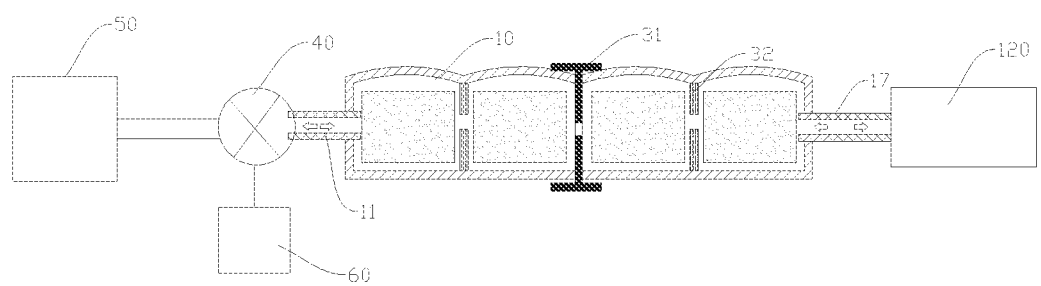
FIG. 23 is a schematic structural diagram of the second device for adjusting comfort of a seat according to an embodiment of the present disclosure when viewed from a second perspective.

In this embodiment, air pressure in the soft inflatable bag 10 is not fixed, and the amount of the gas in the soft inflatable bag 10 can be adjusted by inflation and deflation through the air path 11. FIG. 22 is a schematic structural diagram of the soft inflatable bag when it is uninflated, and FIG. 23 is a schematic structural diagram of the soft inflatable bag 10 filled with gas.

The second device for adjusting comfort of a seat may also include a shock absorption mechanism 120, corresponding to the first device for adjusting comfort of a seat. The shock absorption mechanism 120 may be correspondingly implemented in the form of an elastic sealed pocket 121 or a cylinder assembly.

Figure 24:
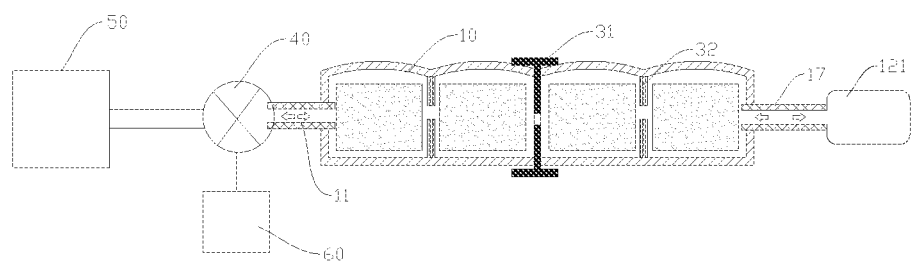
FIG. 24 is a schematic structural diagram of the second device for adjusting comfort of a seat according to an embodiment of the present disclosure when viewed from a third perspective.
Figure 25:
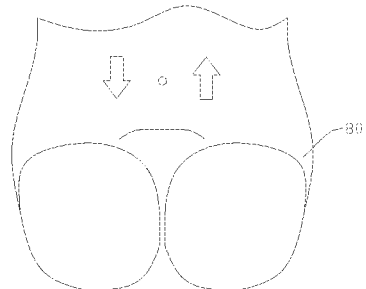
FIG. 25 is a schematic structural diagram of the second device for adjusting comfort of a seat according to an embodiment of the present disclosure when viewed from a fourth perspective.
Figure 25:
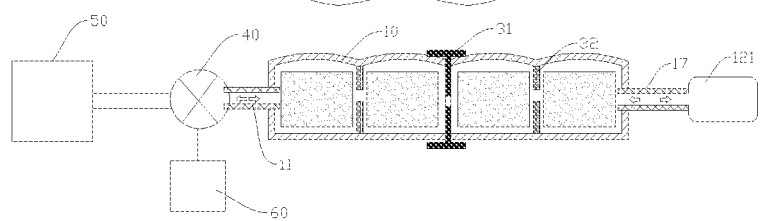

FIG. 24 is a schematic structural diagram of the soft inflatable bag 10 when it is filled with gas and the shock absorption mechanism 120 is an elastic sealed pocket 121. As shown in FIG. 25, when the seat is jounced, the gas enters the inside of the elastic sealed pocket 121, and the volume of the pocket body is increased. When the impact force disappears, the deformation of the soft inflatable bag 10 disappears, the contraction force of the elastic sealed pocket 121 is greater than the pressure of the soft inflatable bag 10, and the elastic sealed pocket 121 is reduced in volume and restored to the original state.

Figure 26:
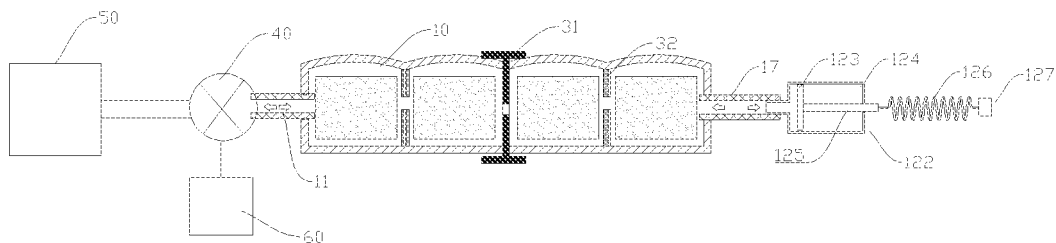
FIG. 26 is a schematic structural diagram of the second device for adjusting comfort of a seat according to an embodiment of the present disclosure when viewed from a fifth perspective.
Figure 27:
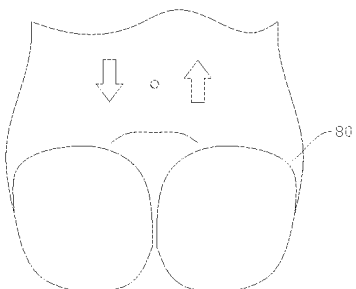
FIG. 27 is a schematic structural diagram of the second device for adjusting comfort of a seat according to an embodiment of the present disclosure when viewed from a sixth perspective.
Figure 27:
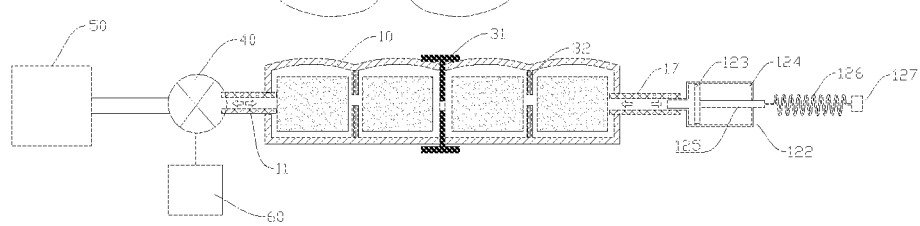

FIG. 26 is a schematic structural diagram of the soft inflatable bag 10 when it is filled with gas and the shock absorption mechanism 120 consists of a cylinder 122 and other related components. As shown in FIG. 27, when the seat is jounced, there is a sudden increase in pressure, air in the soft inflatable bag 10 will be partially compressed into the first cavity 123. The sudden increase in pressure in the first cavity 123 will push the piston 125 to move toward the direction of the second cavity 124, and the return spring 126 is squeezed. When the impact force disappears, the pressure of the soft inflatable bag 10 decreases. The piston 125 is moved toward the direction of the first cavity 123 under the action of the restoring force of the return spring 126. Thus, the gas in the first cavity 123 is squeezed by the piston 125 and flows back into the soft inflatable bag 10 until the return spring 126 is restored to its original state, and the soft inflatable bag 10 is restored to the original state of softness.

Generally, an adjustment for absorbing shock from the soft inflatable bag 10 by the shock absorption mechanism 120 is suitable for being performed when the air pressure in the soft inflatable bag 10 has been stabilized, that is, when the air path 11 is in a closed state.

Here, the air path 11 generally refers to an air path structure that supplies an air source to the soft inflatable bag 10. For example, the air path 11 includes an air nozzle fixed to the soft inflatable bag 10, and an air pipe fixedly connected to the air nozzle. The air pipe has an end connected to an air outlet of a solenoid valve module 40, and an air inlet of the solenoid valve module 40 is connected with an air source 50. As shown in FIG. 28, the solenoid valve module 40 includes, for example, a two-position two-way solenoid valve 41 and a two-position three-way solenoid valve 42 connected in series. In other words, the air inlet of the two-position two-way solenoid valve 41 serves as the air inlet of the entire solenoid valve module 40, and the air outlet of the two-position two-way solenoid valve 41 communicates with the air inlet of the two-position three-way solenoid valve 42. The air outlet of the two-position three-way solenoid valve 42 is connected to the air pipe and the soft inflatable bag 10, and the deflation port of the two-position three-way solenoid valve 42 serves as the deflation port of the entire solenoid valve module 40. When only the two-position two-way solenoid valve 41 is energized, the soft inflatable bag 10 is inflated. When only the two-position three-way solenoid valve 42 is energized, the soft inflatable bag 10 is deflated. When neither of the solenoid valves is energized, the soft inflatable bag 10 is in a state of maintaining pressure. The energization and de-energization of the solenoid valve module 40 are controlled by a control module 60. The control module 60 may be, for example, a control circuit consisting of a single-chip microcomputer as a core processor. When the air source 50 is an air pump, the air pump and the solenoid valve module 40 may be integrated in one piece, and the control module 60 may be a control circuit in the integrated component.

In other embodiments, the solenoid valve module 40 may be replaced by a manual valve. In this case, the manual valve includes a pressing airbag. The pressing airbag has an air outlet provided with an air discharging one-way valve, and an air inlet provided with an air feeding one-way valve. When the pressing airbag is manually squeezed, the pressure in the pressing airbag increases, and the air discharging one-way valve is opened so that the soft inflatable bag 10 is inflated. When the pressing airbag is released, the pressure in the pressing airbag is decreased, and external air is fed into the pressing airbag through the air feeding one-way valve. In this way, the soft inflatable bag 10 can be inflated by repeating the operation for the pressing airbag.

In this embodiment, one soft inflatable bag 10 is provided with one air path 11. In other embodiments, one soft inflatable bag 10 may be provided with a plurality of air paths 11, so that each portion of the soft inflatable bag 10 has uniform softness. Of course, the device may include a plurality of soft inflatable bags 10.

Figure 29:
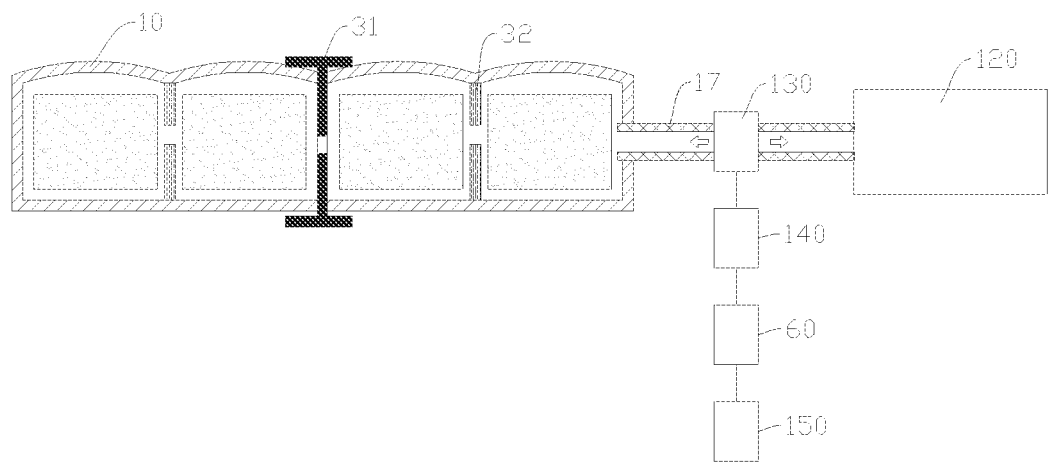
FIG. 29 is a schematic structural diagram of a third device for adjusting comfort of a seat according to an embodiment of the present disclosure.

Referring to FIG. 29, FIG. 29 shows a third device for adjusting comfort of a seat according to this embodiment, which is modified on the basis of the first device for adjusting comfort of a seat. As shown in FIG. 29, the device for adjusting comfort of a seat further includes a flow adjustment mechanism 130 configured to adjust a flow rate in the connecting pipeline 17.

Figure 30:
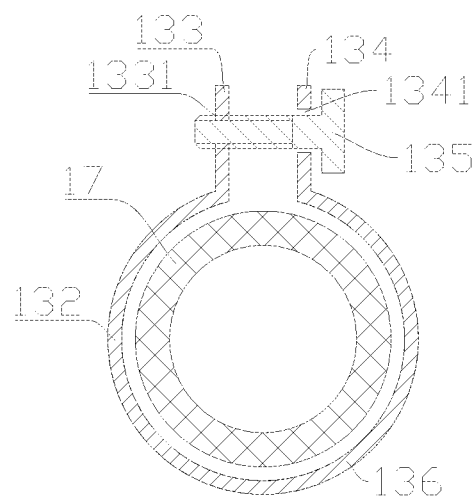
FIG. 30 is a schematic structural diagram of a hoop in the third device for adjusting comfort of a seat according to an embodiment of the present disclosure when viewed from a first perspective.

In this embodiment, as shown in FIG. 30, the flow adjustment mechanism 130 includes a hoop 132 sleeved around the connecting pipeline 17. The hoop 132 includes an annular portion 136 provided with an opening, and a first adjusting piece 133 and a second adjusting piece 134 extend in parallel outward from two movable ends of the annular portion 136. The first adjusting piece 133 is provided with a threaded hole 1331, and the second adjusting piece 134 is provided with a smooth through hole 1341 corresponding to the threaded hole 1331. A screw handle 135 passing through the through hole 1341 is threadedly fixed in the threaded hole 1331.

Figure 31:
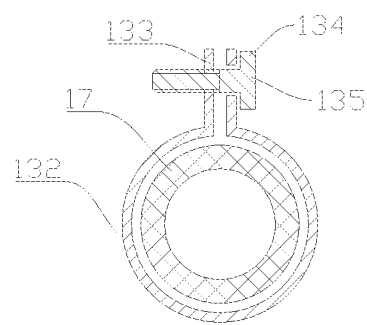
FIG. 31 is a schematic structural diagram of the hoop in the third device for adjusting comfort of a seat according to an embodiment of the present disclosure when viewed from a second perspective.

The above-mentioned flow adjustment mechanism 130 adjusts the flow rate through the connecting pipeline 17 by adjusting the size of the annular portion 136. As shown in FIG. 31, when the screw handle 135 is rotated clockwise, the screw handle 135 is moved toward the direction of the first adjusting piece 133 to bring the first adjusting piece 133 and the second adjusting piece 134 closer to each other, so that the aperture of the annular portion 136 of the hoop 132 is reduced, and the diameter of the connecting pipeline 17 is also reduced at that position, whereby the flow rate through the connecting pipeline 17 is decreased. Conversely, when the screw handle 135 is rotated counterclockwise, the flow rate through the connecting pipeline 17 can be increased.

When an occupant requires a seat to have high hardness, a decrease in the flow rate through the connecting pipeline 17 allows a decrease in change of the hardness of the soft inflatable bag 10, thereby avoiding a sudden change from high hardness to softness and maintaining the high hardness of the seat required by the occupant. When an occupant requires the seat to have low hardness, an increase in the flow rate through the connecting pipeline 17 allows air pressure in the soft inflatable bag 10 to be released quickly without affecting the softness required by the occupant.

The adjustment performed by the flow adjustment mechanism 130 described above is implemented by manual adjustment. In an optional embodiment, electric adjustment may be used. In this case, the device for adjusting comfort of a seat further includes a micromotor 140. The micromotor 140 has an output shaft fixedly connected to the screw handle 135 in an axial direction. The micromotor 140 is controlled by the control module 60 to rotate forward or reversely.

The electric adjustment may be optionally implemented in the following two forms.

An input module 150, such as an input panel which has a high flow button and a low flow button, is arranged. When the user clicks on the high flow button, the control module 60 controls the micromotor 140 to drive the rotation of the screw handle 135, so that the hoop 132 is enlarged to increase the flow rate through the connecting pipeline 17. When the user clicks on the low flow button, the control module 60 controls the micromotor 140 to drive the rotation of the screw handle 135, so that the hoop 132 is contracted to decrease the flow rate through the connecting pipeline 17.

The device for adjusting comfort of a seat may further include a pressure sensor configured to detect the magnitude of the pressure in the soft inflatable bag 10, and a solenoid valve module 40 configured to close or open the air path 11. The control module 60 is electrically connected to the input module 150. The input module 150 is configured to input a set pressure corresponding to the soft inflatable bag 10. The control module 60 is configured to receive a pressure signal from the pressure sensor and to stop inflation of the soft inflatable bag 10 when the pressure signal is determined to reach the set pressure. Therefore, in this embodiment, the pressure in the soft inflatable bag 10 is set as required. The flow rate through the connecting pipeline 17 can be adjusted according to the set pressure. In other words, the control module 60 can automatically determine whether the current flow rate should be increased or decreased, according to information on the required softness state.

Figure 32:
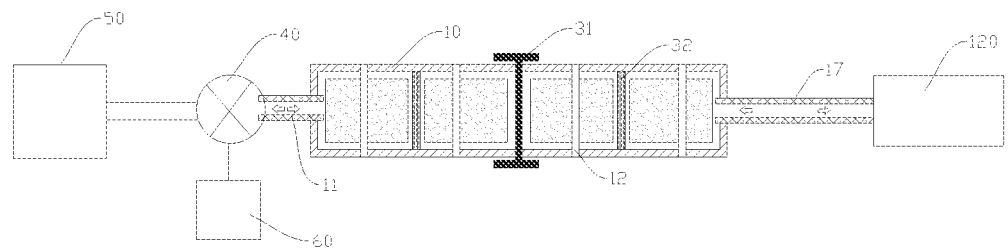
FIG. 32 is a schematic structural diagram of a fourth device for adjusting comfort of a seat according to an embodiment of the present disclosure.
Figure 33:
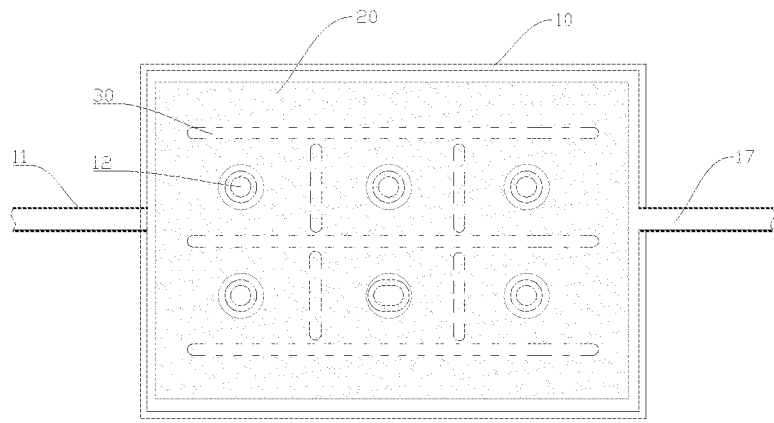
FIG. 33 is a schematic structural top view of a soft inflatable bag in the fourth device for adjusting comfort of a seat according to an embodiment of the present disclosure.

Referring to FIGS. 32 and 33, FIGS. 32 and 33 show a fourth device for adjusting comfort of a seat according to this embodiment, which is modified on the basis of the second device for adjusting comfort of a seat and retains most of the structures of the second device for adjusting comfort of a seat, including, for example, each type of shock absorption mechanism 120 shown above. The difference lies in that, as shown in FIGS. 32 and 33, the soft inflatable bag 10 is further provided with a number of air guide channels 12 configured to conduct airflow on both sides of the soft inflatable bag 10. The air guide channels 12 are isolated from a cavity of the soft inflatable bag 10. The cavity of the soft inflatable bag 10 is a cavity filled with a flexible filler 20, namely, a cavity configured to contain a charged gas.

This device for adjusting comfort of a seat is applicable to a vehicle seat with ventilation performance. Wind (or airflow) directed from the bottom of the seat to the surface of the seat may be blown out from the air guide channels 12 and finally blown to a human body through the seat surface. The arrangement of the air guide channels in the device for adjusting comfort of a seat in this embodiment further improves the applicability of the device.

Similarly, the device for adjusting comfort of a seat is also suitable for the ventilation of the suction-type seat.

Referring to FIG. 5, FIG. 5 show a seventh vehicle seat 70 according to this embodiment. As shown in FIG. 5, the first devices for adjusting comfort of a seat are integrated into a backrest 71, a shoulder 71-1, a seat cushion 72, and side wings 73 of the vehicle seat 70. In other embodiments, the device for adjusting comfort of a seat may be arranged in any one or more of the backrest 71, the seat cushion 72, and the side wings 73 of the vehicle seat.

The seat cushion 72 of the vehicle seat 70 is taken as an example. The soft inflatable bag is mounted between a seat cover 75 and a foam structure 74 of the seat cushion 72. The air path 11 of the soft inflatable bag 10 extends from the bottom through the foam structure 74 and is connected to the air source 50.

In FIG. 5, solenoid valve modules 40 are mounted in the air paths 11 of the soft inflatable bags 10 arranged at the individual parts of the vehicle seat 70, respectively. A control module 60 of the vehicle seat 70 controls the inflation and deflation of each of the soft inflatable bags 10 independently of one another by controlling ON and OFF of each of the solenoid valve modules 40. The independent control of each of the soft inflatable bags 10 allows each of the soft inflatable bags 10 to be inflated and deflated independently, so that the individual soft inflatable bags 10 can form different inflated and deflated combinations to achieve the adjustment of multiple functions and different hardness.

Optionally, in other embodiments, all the soft inflatable bags 10 in the vehicle seat 70 are arranged in groups, and the air paths of each group of soft inflatable bags 10 converge on a branch air path in which a branch solenoid valve module is mounted. The control module 60 controls the inflation and deflation of each group of soft inflatable bags 10 by controlling ON and OFF of each group of branch solenoid valve module.

The soft inflatable bags 10 may be grouped based on a rule set according to the position regions or actual use requirements or control requirements. For example, when the soft inflatable bags are grouped by region, the air paths 11 of all the soft inflatable bags 10 located in the side wings 73 are arranged in parallel and connected to a common branch air path. All the soft inflatable bags 10 in the seat cushion 72 are arranged in parallel and connected to a common branch air path. All the soft inflatable bags 10 in the backrest 71 are arranged in parallel and connected to a common branch air path. The soft inflatable bags 10 arranged in groups can be controlled wholly, so that the soft inflatable bags in the same region act synchronously.

The seat cushion 72 part of the vehicle seat 70 is taken as an example. A driver or passenger 80 is sitting in a seat equipped with a soft inflatable bag 10. When the soft inflatable bag 10 is in an unfilled state, the height limiting structures 30 are bent and collapsed. The soft inflatable bag 10 and the flexible filler therein are compressed, so that the surface of the seat is in a relatively soft state, and the torso of the human body sinks deeper into the seat surface as shown in FIG. 6. When the driver or passenger 80 is sitting on the seat surface and the soft inflatable bag 10 is in a filled state, the height limiting structures 30 are relatively stretched. The soft inflatable bag 10 and the flexible filler 20 therein are only slightly compressed, so that the surface of the seat is in a relatively hard state, and the torso of the human body sinks shallowly into the seat surface as shown in FIG. 7. Therefore, the solution of this embodiment provides a seat with adjustable different softness.

Referring to FIGS. 8 to 10, FIGS. 8 to 10 show an eighth vehicle seat 70 according to this embodiment, which is modified on the basis of the fourth vehicle seat. Multiple layers of soft inflatable bags 10 are arranged in a stacked manner in a softness adjustment region 701 of the vehicle seat 70. The softness adjustment region 701 is a region in the vehicle seat 70 in which the soft inflatable bags 10 are arranged. This embodiment is described by taking two layers of soft inflatable bags 10 as an example.

The two layers of soft inflatable bags 10 may be specifically arranged in either of the following manners.

1. Adjacent Stacking. As shown in FIG. 8, soft inflatable bag accommodating grooves 76 configured for placement of the soft inflatable bags 10 are provided in a side of the foam structure 74 of the seat adjacent to the seat cover 75. There are three soft inflatable bag accommodating grooves 76, namely, two symmetrically arranged upper soft inflatable bag accommodating grooves 76-1 and one lower soft inflatable bag accommodating groove 76-2. A first soft inflatable bag 13 and a second soft inflatable bag 14 are arranged side by side in the two upper soft inflatable bag accommodating grooves 76-1. A third soft inflatable bag 15 is arranged in the lower soft inflatable bag accommodating groove 76-2.

Here, the first soft inflatable bag 13 and the second soft inflatable bag 14 are simultaneously controlled to be inflated or deflated, and a flexible liner 77 is arranged between the first and second soft inflatable bags 13 and 14 and the seat cover 75. Partial slight swelling occurs around the height limiting structures 30, resulting in a slightly uneven state. The flexible liner 77 can compensate for this state to enhance the comfort and flatness of the surface of the seat. When only the first soft inflatable bag 13 and the second soft inflatable bag 14 in the upper soft inflatable bag accommodating grooves 76-1 are inflated, or only the third soft inflatable bag 15 is inflated, moderate hardness can be provided to the seat cushion of the seat. When the first soft inflatable bag 13, the second soft inflatable bag 14, and the third soft inflatable bag 15 are inflated at the same time, higher hardness can be provided to the seat cushion of the seat. When only the third soft inflatable bag 15 is inflated, because the occupant does not come in direct contact with this soft inflatable bag 10, the hardness is adjusted with a certain cushioning distance from the third soft inflatable bag 15 to the occupant, which further improves the comfort in adjusting the hardness.

2. Spaced Stacking. As shown in FIG. 9, the two layers of soft inflatable bags 10 are located on a side close to the seat cover 75 and a side remote from the seat cover 75, respectively. Because the third soft inflatable bag 15 at the bottom is in direct contact with a support frame 78 of the vehicle seat 70, a flexible liner 77 is also arranged between the third soft inflatable bag 15 and the support frame 78 in order to protect the third soft inflatable bag 15. Of course, if the bag body of the third soft inflatable bag 15 is made of a relatively strong material, its bottom may not be provided with a flexible liner 77 as shown in FIG. 10.

Referring to FIG. 11, FIG. 11 shows a ninth vehicle seat 70 according to this embodiment, which is modified on the basis of the fifth vehicle seat 70. As shown in FIG. 11, the foam structure 74 is further provided with a covering body accommodating groove 79 configured for placement of a covering body 90, on a side of the soft inflatable bag accommodating groove 76 close to the seat cover 75. A trapezoidal structure is formed by the covering body accommodating groove 79 and the soft inflatable bag accommodating groove 76. When the soft inflatable bag 10 is inflated, partial slight swelling occurs around the height limiting structures 30, resulting in a slightly uneven state. The covering body 90 can compensate for this state to enhance the comfort and flatness of the surface of the seat.

The covering body accommodating groove 79 is wider than the soft inflatable bag accommodating groove 76 and can fully cover the edge of the soft inflatable bag to protect the soft inflatable bag 10.

The covering body 90 and the flexible liner 77 described above may be made of the same material. For example, both are made of a flexible material such as non-woven fabric, non-woven felt, foam or sponge pad.

Referring to FIGS. 12 to 15, FIGS. 12 to 15 show a tenth vehicle seat 70 according to this embodiment, which is modified on the basis of the fourth vehicle seat 70 by replacing the structure of the soft inflatable bag 10 with the soft inflatable bag structure in the third device for adjusting comfort of a seat. In this case, a heating pad 100 is further arranged between the soft inflatable bag 10 and the seat cover 75. The vehicle seat 70 has a ventilation structure. The ventilation structure includes an air guide structure 110 arranged at the bottom of the vehicle seat 70. The foam structure 74 is provided therein with a ventilation channel 74-1. An air flow directed from the air guide structure 110 flows out from the ventilation channel 74-1 and then circulates to a side of the seat, on which the seat cover 75 is arranged, through the air guide channels 12 of the soft inflatable bag 10.

As shown in FIGS. 12 to 14, the vehicle seat 70 is integrated with the functions of heating, ventilation, and softness adjustment. The backrest 71 and the seat cushion 72 of the vehicle seat 70 are provided with heating pads 100. More functions are achieved. The arrangement of ventilation holes 70-1 may be added as required. When there are ventilation, softness adjustment, and heating functions, the substrate of the heating pad may be selected from a substrate with good air permeability, or the heating pad may be provided with an opening. The heating, ventilation, and softness adjustment can be integrated into one control module for control and adjustment to reduce cost.

Optionally, as shown in FIG. 14, the adjustment of softness may correspondingly be implemented by multi-leveled adjustment. With reference to FIG. 14, in order to match the vehicle seat 70 with a ventilation structure, multiple soft inflatable bags 10 spaced from each other may be arranged on the same layer, and a ventilation channel 74-1 leading to the direction of the seat cover 75 may be provided in the foam structure 74 between the soft inflatable bags 10. Positions for the ventilation channel 74-1 are reserved between the first soft inflatable bag 13 and the second soft inflatable bag 14 arranged side by side on the upper part, and between the third soft inflatable bag 15 and the fourth soft inflatable bag 16 arranged side by side at the lower part. It can be seen from the enlarged view of part A of the figure that when the soft inflatable bag 10 is inflated, a partial swelling state occurs around the height limiting structures 30. The flexible liner 77 can just compensate for this state to enhance the comfort and flatness of the surface of the seat.

Optionally, as shown in FIG. 15, the vehicle seat 70 may also be provided with a covering body accommodating groove 79 configured for placement of a covering body 90 above the soft inflatable bag accommodating groove 76.

In some embodiments:

Referring to FIG. 1, the device for adjusting softness of a seat shown in FIG. 1 includes a soft inflatable bag 10, a penetrating-type height limiting strap 31, a built-in height limiting strap 32, a flexible filler 20, an air path 11, a solenoid valve module 40, an air source 50, and a control module 60. The soft inflatable bag 10 is filled with the flexible filler 20, and both the penetrating-type height limiting strap 31 and the built-in height limiting strap 32 act on the soft inflatable bag 10 and are configured to limit the partial expansion height of the soft inflatable bag 10 when it is inflated. One end of the soft inflatable bag 10 communicates with one end of the air path 11. The other end of the air path 11 communicates with the solenoid valve module 40. The solenoid valve module 40 communicates with the air source 50. The air source 50 is configured to inflate and deflate the soft inflatable bag 10 through the solenoid valve module 40 and the air path 11. The control module 60 is electrically connected to the solenoid valve module 40 to control the solenoid valve module 40 so as to control the inflation and deflation of the soft inflatable bag 10, for example.

Referring to FIG. 2, the device for adjusting softness of a seat shown in FIG. 2 includes a soft inflatable bag 10 and a flexible filler 20 contained in the soft inflatable bag 10, and the soft inflatable bag 10 is equipped with a height limiting structure 30 configured to limit the partial expansion height of the soft inflatable bag 10 when it is inflated. Here, the height limiting structure 30 includes a penetrating-type height limiting strap 31 and a built-in height limiting strap 32. There are multiple penetrating-type height limiting straps 31 and multiple built-in height limiting straps 32, and their distribution positions and shapes are not limited. The soft inflatable bag 10 is connected with an air path 11.

Referring to FIG. 3, the device for adjusting softness of a seat shown in FIG. 3 has substantially the same structure as that of the device for adjusting softness of a seat shown in FIG. 1, except that the soft inflatable bag 10 is provided with an air guide channel 12 extending therethrough, and the air guide channel 12 is isolated from the inside of the soft inflatable bag 10. The air guide channel 12 is configured to communicate the regions on the two opposite sides of the soft inflatable bag 10 with each other.

Referring to FIG. 4, the device for adjusting softness of a seat shown in FIG. 4 has substantially the same structure as that of the device for adjusting softness of a seat shown in FIG. 2, except that the soft inflatable bag 10 is provided with air guide channels 12 extending therethrough, and six air guide channels 12 are provided and are distributed evenly. During specific implementation, the number of air guide channels is set according to actual situations. For example, seven, eight or more, or five or four air guide channels 12 may be provided.

Referring to FIG. 5, the vehicle seat 70 shown in FIG. 5 includes a backrest 71, a shoulder 71-1, a seat cushion 72, side wings 73, a control module 60, and an air source 50. The backrest 71, the seat cushion 72, and the side wings 73 each include a plurality of independent cushions. The above-mentioned soft inflatable bag 10 is built in each of the backrest 71, the shoulder 71-1, the seat cushion 72, and the side wings 73. The soft inflatable bag 10 is connected to the above-mentioned solenoid valve module 40 via the above-mentioned air path 11. The solenoid valve module 40 is integrated with the control module 60 and is connected to a plurality of air sources 50.

Referring to FIG. 6, the vehicle seat 70 shown in FIG. 6 includes a seat cover 75 and a foam structure 74 located inside the seat cover 75. A soft inflatable bag 10 described above is mounted on a side of the foam structure 74 close to the seat cover 75. The soft inflatable bag 10 is provided with a height limiting structure 30. The soft inflatable bag 10 is connected with an air path 11. In this case, a driver or passenger 80 is sitting in the seat equipped with a soft inflatable bag 10, the soft inflatable bag 10 is in an unfilled state, and the height limiting structures 30 are bent and collapsed. The soft inflatable bag 10 and the flexible filler 20 therein are compressed, so that the surface of the seat is in a relatively soft state, and the torso of the human body sinks deeper into the seat surface.

Referring to FIG. 7, the vehicle seat 70 shown in FIG. 7 has the same structure as the vehicle seat 70 in FIG. 6. In this case, the driver or passenger 80 is sitting on the seat surface, the soft inflatable bag 10 is in a filled state, and the height limiting structures 30 are relatively stretched. The soft inflatable bag 10 and the flexible filler 20 therein are only slightly compressed, so that the surface of the seat is in a relatively hard state, and the torso of the human body sinks shallowly into the seat surface.

Referring to FIG. 8, the vehicle seat 70 shown in FIG. 8 has a softness adjustment region 701 provided with a soft inflatable bag accommodating groove 76 and a soft inflatable bag 10 located in the soft inflatable bag accommodating groove 76. Here, the soft inflatable bag accommodating groove 76 includes two upper soft inflatable bag accommodating grooves 76-1 and one lower soft inflatable bag accommodating groove 76-2. The two upper soft inflatable bag accommodating grooves 76-1 are arranged side by side and spaced apart from each other in a horizontal direction. The two upper soft inflatable bag accommodating grooves 76-1 are both distributed near the upper side of the vehicle seat 70. The lower soft inflatable bag accommodating groove 76-2 is located under the upper soft inflatable bag accommodating grooves 76-1 and is arranged in close contact with both of the two upper soft inflatable bag accommodating grooves 76-1. The soft inflatable bag 10 includes a first soft inflatable bag 13, a second soft inflatable bag 14, and a third soft inflatable bag 15, and the first soft inflatable bag 13 and the second soft inflatable bag 14 are accommodated in the two upper soft inflatable bag accommodating grooves 76-1, respectively, and the third soft inflatable bag 15 is accommodated in the lower soft inflatable bag accommodating groove 76-2. Each of the first soft inflatable bag 13, the second soft inflatable bag 14, and the third soft inflatable bag 15 is connected with an air path 11. The seat surface of the vehicle seat 70 is provided with a flexible liner 77, and a foam structure 74 is built in the seat cover 75 of the vehicle seat 70.

Referring to FIG. 9, the vehicle seat 70 shown in FIG. 9 has substantially the same structure as the vehicle seat 70 shown in FIG. 8, except that the lower soft inflatable bag accommodating groove 76-2 is arranged to be spaced apart from the two upper soft inflatable bag accommodating grooves 76-1. The lower soft inflatable bag accommodating groove 76-2 is arranged near the support frame 78 of the vehicle seat 70. Flexible liners 77 are distributed on both the upper and lower sides of the foam structure 74 of the vehicle seat 70.

Referring to FIG. 10, the vehicle seat 70 shown in FIG. 10 has substantially the same structure as the vehicle seat 70 shown in FIG. 9, except that a flexible liner 77 is distributed on the upper side of the foam structure 74 of the vehicle seat 70, while no flexible liner 77 is distributed on the lower side of the foam structure 74 of the vehicle seat 70.

Referring to FIG. 11, the vehicle seat 70 shown in FIG. 11 has a foam structure 74 provided with a covering body accommodating groove 79 configured for placement of a covering body 90, on a side of the soft inflatable bag accommodating groove 76 close to the seat cover 75. A trapezoidal structure is formed by the covering body accommodating groove 79 and the soft inflatable bag accommodating groove 76. A soft inflatable bag 10 is accommodated in the soft inflatable bag accommodating groove 76, and the soft inflatable bag 10 is connected with an air path 11. The air path 11 is arranged to extend through the foam structure 74. A flexible liner 77 is sandwiched between the seat cover 75 and the foam structure 74.

Referring to FIG. 12, the vehicle seat 70 shown in FIG. 12 has substantially the same structure as the vehicle seat 70 shown in FIG. 9, except that the bottom of the vehicle seat 70 is provided with an air guide structure 110, and the foam structure 74 is provided with a ventilation channel 74-1. Moreover, the soft inflatable bag 10 is provided with air guide channels 12. The vehicle seat 70 further includes a heating pad 100 arranged between the soft inflatable bag 10 and the seat cover 75. In this way, when there is an air flow at the bottom of the vehicle seat 70, the air flow may be directed through the air guide structure 110, and flow out from the ventilation channel 74-1 and then circulate to a side of the seat, on which the seat cover 75 is arranged, through the air guide channels 12 of the soft inflatable bag 10.

Referring to FIG. 13, the vehicle seat 70 shown in FIG. 13 has substantially the same structure as the vehicle seat 70 shown in FIG. 5, except that the vehicle seat 70 further includes a heating pad 100, and ventilation holes 70-1 are provided at positions of the backrest 71 of the vehicle seat 70.

Referring to FIG. 14, the vehicle seat 70 shown in FIG. 14 has substantially the same structure as the vehicle seat 70 shown in FIG. 9, except that the soft inflatable bag 10 includes a first soft inflatable bag 13 and a second soft inflatable bag 14 arranged side by side on the upper part, and a third soft inflatable bag 15 and a fourth soft inflatable bag 16 arranged side by side at the lower part. Moreover, the ventilation channels 74-1 are formed between the first soft inflatable bag 13 and the second soft inflatable bag 14 and between the third soft inflatable bag 15 and the fourth soft inflatable bag 16. The vehicle seat 70 further includes a heating pad 100 arranged between the soft inflatable bag 10 and the seat cover 75.

Referring to FIG. 15, the vehicle seat 70 shown in FIG. 15 has substantially the same structure as the vehicle seat 70 shown in FIG. 11, except that the vehicle seat 70 further includes a heating pad 100 arranged between the soft inflatable bag 10 and the seat cover 75.

Referring to FIG. 16, the device for adjusting comfort of a seat shown in FIG. 16 includes a soft inflatable bag 10, a height limiting structure 30, a flexible filler 20, a connecting pipeline 17, and a shock absorption mechanism 120. The soft inflatable bag 10 is filled with the flexible filler 20. The height limiting structure 30 includes a penetrating-type height limiting strap 31 and a built-in height limiting strap 32. Both the penetrating-type height limiting strap 31 and the built-in height limiting strap 32 act on the soft inflatable bag 10 and are configured to limit the partial expansion height of the soft inflatable bag 10 when it is inflated. Moreover, both the penetrating-type height limiting strap 31 and the built-in height limiting strap 32 are provided with openings 301 configured to conduct gas on both sides of the penetrating-type height limiting strap 31 and the built-in height limiting strap 32, respectively. One end of the soft inflatable bag 10 is connected to one end of the connecting pipeline 17. The other end of the connecting pipeline 17 is connected to the shock absorption mechanism 120 configured to release pressure from the soft inflatable bag 10 when a suddenly changed squeezing force is exerted on the soft inflatable bag 10.

Referring to FIG. 17, the device for adjusting comfort of a seat shown in FIG. 17 has basically the same structure as the device for adjusting comfort of a seat shown in FIG. 16. Specifically, the shock absorption mechanism 120 is defined as an elastic sealed pocket 121 communicating with the connecting pipeline 17.

Referring to FIG. 18, the device for adjusting comfort of a seat shown in FIG. 18 has basically the same structure as the device for adjusting comfort of a seat shown in FIG. 17. Here, FIG. 18 also shows a driver or passenger 80 who is about to sit on the device for adjusting comfort of a seat. When he/she sits on the device for adjusting comfort of a seat, air in the soft inflatable bag 10 will flow into the elastic sealed pocket 121 through the connecting pipeline 17. When he/she leaves the device for adjusting comfort of a seat, the elastic sealed pocket 121 is restored to its original state, and the gas in the elastic sealed pocket 121 flows back to the soft inflatable bag 10.

Referring to FIG. 19, the device for adjusting comfort of a seat shown in FIG. 19 has substantially the same structure as the device for adjusting comfort of a seat shown in FIG. 17, except that the shock absorption mechanism 120 is defined in the form of a cylinder 122. Specifically, the cylinder 122 has a first cavity 123 and a second cavity 124. The connecting pipeline 17 communicates the cavity of the soft inflatable bag 10 and the first cavity 123 with each other. The cylinder 122 includes a piston 125 having a protruding end fixedly connected to one end of a return spring 126. The other end of the return spring 126 is connected to a fixed structure 127.

Referring to FIG. 20, the device for adjusting comfort of a seat shown in FIG. 20 has basically the same structure as the device for adjusting comfort of a seat shown in FIG. 19. Here, FIG. 20 also shows a driver or passenger 80 who is about to sit on the device for adjusting comfort of a seat. When he/she sits on the device for adjusting comfort of a seat, air in the soft inflatable bag 10 will flow into the first cavity 123 through the connecting pipeline 17, the piston 125 is pushed and moved toward the return spring 126, and the return spring 126 is compressed. When he/she leaves the device for adjusting comfort of a seat, the return spring 126 is restored to its original state and pushes the piston 125 to move, so that the gas in the first cavity 123 flows back to the soft inflatable bag 10.

Figure 21:
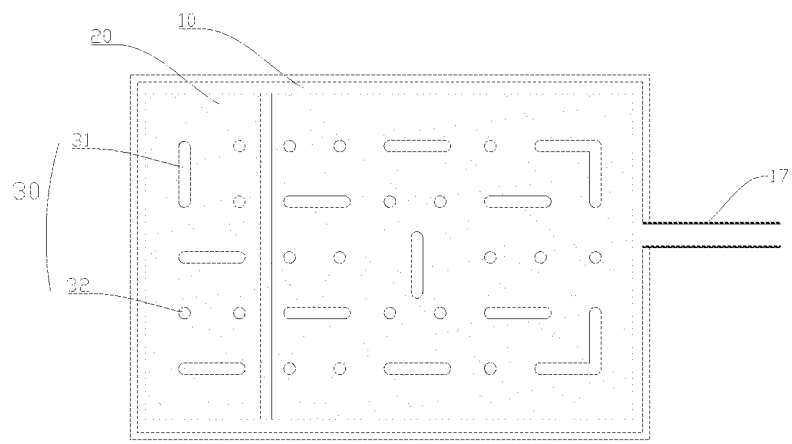
FIG. 21 is a schematic structural top view of a soft inflatable bag according to an embodiment of the present disclosure.

Referring to FIG. 21, the device for adjusting comfort of a seat shown in FIG. 21 includes a soft inflatable bag 10 and a flexible filler 20 built in the soft inflatable bag 10, and the soft inflatable bag 10 is equipped with a height limiting structure 30 configured to limit the partial expansion height of the soft inflatable bag 10 when it is inflated. The height limiting structure 30 includes multiple penetrating-type height limiting straps 31 and multiple built-in height limiting straps 32, and their shapes and distribution positions are not limited. The soft inflatable bag 10 is further connected with a connecting pipeline 17.

Referring to FIG. 22, the device for adjusting comfort of a seat shown in FIG. 22 has substantially the same structure as the device for adjusting comfort of a seat shown in FIG. 16, except that the soft inflatable bag 10 has one end communicating with a connecting pipeline 17, and the other end communicating with one end of the air path 11. The other end of the air path 11 communicates with a solenoid valve module 40. The solenoid valve module 40 communicates with an air source 50, and the solenoid valve module 40 is electrically connected to a control module 60. The solenoid valve module 40 is controlled by the control module 60. In this case, the soft inflatable bag 10 is not in an expanded state.

Referring to FIG. 23, the device for adjusting comfort of a seat shown in FIG. 23 has basically the same structure as the device for adjusting comfort of a seat shown in FIG. 22. In this case, the soft inflatable bag 10 is in an expanded state.

Referring to FIG. 24, the device for adjusting comfort of a seat shown in FIG. 24 has basically the same structure as the device for adjusting comfort of a seat shown in FIG. 23. Specifically, in FIG. 24, the shock absorption mechanism 120 is defined as an elastic sealed pocket 121.

Referring to FIG. 25, the device for adjusting comfort of a seat shown in FIG. 25 has basically the same structure as the device for adjusting comfort of a seat shown in FIG. 24. Here, FIG. 25 also shows a driver or passenger 80 who is about to sit on the device for adjusting comfort of a seat. When he/she sits on the device for adjusting comfort of a seat, air in the soft inflatable bag 10 will flow into the elastic sealed pocket 121 through the connecting pipeline 17. When he/she leaves the device for adjusting comfort of a seat, the elastic sealed pocket 121 is restored to its original state, and the gas in the elastic sealed pocket 121 flows back to the soft inflatable bag 10.

Referring to FIG. 26, the device for adjusting comfort of a seat shown in FIG. 26 has substantially the same structure as the device for adjusting comfort of a seat shown in FIG. 19, except that the soft inflatable bag 10 has one end communicating with a connecting pipeline 17, and the other end communicating with one end of the air path 11. The other end of the air path 11 communicates with a solenoid valve module 40. The solenoid valve module 40 communicates with an air source 50, and the solenoid valve module 40 is electrically connected to a control module 60. The solenoid valve module 40 is controlled by the control module 60. In this case, the soft inflatable bag 10 is not in an expanded state.

Referring to FIG. 27, the device for adjusting comfort of a seat shown in FIG. 27 has basically the same structure as the device for adjusting comfort of a seat shown in FIG. 26. Here, FIG. 27 also shows a driver or passenger 80 who is about to sit on the device for adjusting comfort of a seat. When he/she sits on the device for adjusting comfort of a seat, air in the soft inflatable bag 10 will flow into the first cavity 123 through the connecting pipeline 17, the piston 125 is pushed and moved toward the return spring 126, and the return spring 126 is compressed. When he/she leaves the device for adjusting comfort of a seat, the return spring 126 is restored to its original state and pushes the piston 125 to move, so that the gas in the first cavity 123 flows back to the soft inflatable bag 10.

Referring to FIG. 28, the solenoid valve module 40 shown in FIG. 28 includes a two-position two-way solenoid valve 41 and a two-position three-way solenoid valve 42 connected in series. The two-position two-way solenoid valve 41 communicates with the soft inflatable bag 10. The two-position three-way solenoid valve 42 communicates with the air source 50.

Referring to FIG. 29, the device for adjusting comfort of a seat shown in FIG. 29 has substantially the same structure as the device for adjusting comfort of a seat shown in FIG. 16, except that the connecting pipeline 17 is equipped with a flow adjustment mechanism 130 which is configured to adjust the flow rate of air flowing in the connecting pipeline 17. The flow adjustment mechanism 130 is driven by a micromotor 140. The micromotor 140 is electrically connected to the control module 60, and the micromotor 140 is controlled by the control module 60. Also, an input module 150 is electrically connected to the control module 60. Therefore, after a corresponding command is received from the input module 150, the control module 60 controls the action of the micromotor 140 so as to control the corresponding action of the flow adjustment mechanism 130, to adjust the flow rate of air in the connecting pipeline 17.

Referring to FIG. 30, the flow adjustment mechanism 130 shown in FIG. 30 includes a hoop 132 sleeved around the connecting pipeline 17. The hoop 132 includes an annular portion 136 and a first adjusting piece 133 and a second adjusting piece 134 formed at the two ends of the annular portion 136. The connecting pipeline 17 is accommodated inside the annular portion 136, and the connecting pipeline 17 may be separated from the annular portion 136 through a gap between the first adjusting piece 133 and the second adjusting piece 134. The first adjusting piece 133 is provided with a threaded hole 1331. The second adjusting piece 134 is provided with a smooth through hole 1341. The screw handle 135 passes through the smooth through hole 1341 and then is threadedly fitted to the threaded hole 1331. In this case, an end portion of the screw handle 135 is threadedly fitted to the threaded hole 1331. There is a longer distance between the first adjusting piece 133 and the second adjusting piece 134. The annular portion 136 has a corresponding larger radius. The connecting pipeline 17 is in a normal state. A larger amount of air flow can flow in the connecting pipeline 17.

Referring to FIG. 31, the flow adjustment mechanism 130 shown in FIG. 31 has basically the same structure as the flow adjustment mechanism 130 shown in FIG. 30. In this case, the middle portion of the screw handle 135 is threadedly fitted to the threaded hole 1331. There is a shorter distance between the first adjusting piece 133 and the second adjusting piece 134. The annular portion 136 has a corresponding smaller radius. The connecting pipeline 17 is in a compressed state. A smaller amount of air flow can flow in the connecting pipeline 17.

Referring to FIG. 32, the device for adjusting comfort of a seat shown in FIG. 32 has substantially the same structure as the device for adjusting comfort of a seat shown in FIG. 22, except that the soft inflatable bag 10 is provided with air guide channels 12 extending therethrough, which are isolated from the inside of the soft inflatable bag 10 and which are configured to communicate the regions on the two sides of the soft inflatable bag 10 with each other.

Referring to FIG. 33, the device for adjusting comfort of a seat shown in FIG. 33 includes a soft inflatable bag 10 and a flexible filler 20 built in the soft inflatable bag 10. The soft inflatable bag 10 is provided with height limiting structures 30 and provided with air guide channels 12 extending therethrough. The two ends of the soft inflatable bag 10 are connected with an air path 11 and a connecting pipeline 17, respectively.

Figure 34:
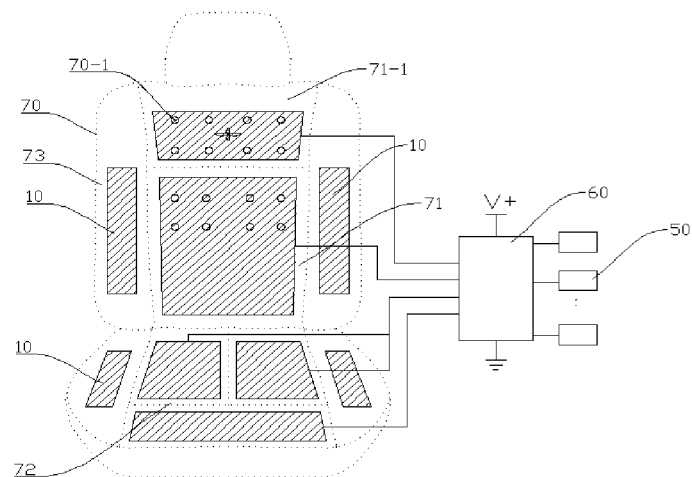
FIG. 34 is a schematic structural diagram of a tenth vehicle seat according to an embodiment of the present disclosure.

Referring to FIG. 34, the vehicle seat 70 shown in FIG. 34 has substantially the same structure as the vehicle seat 70 shown in FIG. 5, except that ventilation holes 70-1 are provided at positions of the shoulder 71-1 of the vehicle seat 70.

It should be noted that the embodiments in the present disclosure and the features in the embodiments can be combined with each other without conflict.

For example, with reference to the device for adjusting softness of a seat or the device for adjusting comfort of a seat described above, such device may include a soft inflatable bag 10, a flexible filler 20 located in the soft inflatable bag 10, an air path 11 communicating with the soft inflatable bag 10, a solenoid valve module 40 connected to one end of the air path 11, an air source 50 supplying air to the soft inflatable bag 10 through the solenoid valve module 40, a height limiting structure 30 arranged in the soft inflatable bag 10, a shock absorption mechanism 120, a connecting pipeline 17 communicating the soft inflatable bag 10 with the shock absorption mechanism 120, a hoop 132 sleeved around the connecting pipeline 17, a screw handle 135 adjusting the degree of tightness of the hoop 132, a micromotor 140 driving a rotation of the screw handle 135, a control module 60 controlling the micromotor 140 and the solenoid valve module 40, an input module 150 inputting a signal to the control module 60, and so on. In specific implementation, all the above-mentioned components may exist in one adjusting device, or some of the above-mentioned components may exist in one adjusting device.

Similarly, the vehicle seat 70 described above may include a backrest 71, a shoulder 71-1, a seat cushion 72, side wings 73, a foam structure 74, a seat cover 75, a flexible liner 77, a support frame 78, a covering body 90, a heating pad 100, an air guide structure 110, and so on. At least one of the backrest 71, the shoulder 71-1, the seat cushion 72, and the side wings 73 of the vehicle seat 70 may be integrated with at least one adjusting device described above. In specific implementation, all the above-mentioned components may exist in one vehicle seat 70, or some of the above-mentioned components may exist in one vehicle seat 70.

The above description is merely illustrative of preferred embodiments of the present disclosure and illustrative of the utilized technical principles. It should be understood by those skilled in the art that the scope of the invention involved in the present disclosure is not limited to the technical solutions formed by specific combinations of the foregoing technical features, and should also encompass other technical solutions formed by any combinations of the foregoing technical features or their equivalents without departing from the inventive concept, e.g., technical solutions formed by replacing the foregoing features with the technical features having similar functions disclosed in (but not limited to) the present disclosure or vice versa.

INDUSTRIAL APPLICABILITY

In summary, the present disclosure provides a device for adjusting softness of a seat, a device for adjusting comfort of a seat, and a vehicle seat, by which improved comfort can be obtained when sitting in the seat.

What is claimed is:

1. A device for adjusting softness of a seat, comprising at least one soft inflatable bag capable of being integrated in the seat, wherein the at least one soft inflatable bag is connected with at least one air path; the at least one soft inflatable bag is filled with a flexible filler; and gas is charged into or discharged from the at least one soft inflatable bag through the at least one air path, so as to adjust the softness of a surface of the seat; and
    the at least one soft inflatable bag is provided with at least one height limiting structure configured to limit a partial expansion height of the at least one soft inflatable bag when inflated.
2. The device for adjusting softness of a seat according to claim 1, wherein the at least one height limiting structure comprises at least one penetrating-type height limiting strap and/or at least one built-in height limiting strap; and/or,
    the at least one height limiting structure is provided with an opening, wherein the opening is configured to conduct gas on both sides of the at least one height limiting structure; and/or,
    the at least one height limiting structures are arranged in a distributed manner; and/or
    the at least one soft inflatable bag is provided with several air guide channels extending through the at least one soft inflatable bag, wherein the air guide channels are isolated from an inflatable cavity of the at least one soft inflatable bag and configured to conduct gas on both sides of the at least one soft inflatable bag.
3. A vehicle seat, wherein a backrest and/or a seat cushion and/or side wings of the vehicle seat is/are integrated with the device for adjusting softness of a seat according to claim 1, wherein at least one air source of the at least one soft inflatable bag is supplied by a micro air pump or by compressed air in a vehicle body; and the at least one soft inflatable bag is located on a surface of a foam structure of the vehicle seat, and a flexible liner is laid outside the at least one soft inflatable bag located on the surface.
4. The vehicle seat according to claim 3, wherein the at least one soft inflatable bag comprises a plurality of soft inflatable bags, wherein at least two layers of soft inflatable bags are arranged, in an adjacently stacked manner or a spacedly stacked manner, in a softness adjustment region of the vehicle seat, wherein the softness adjustment region is a region in the vehicle seat in which the soft inflatable bags are arranged.
5. The vehicle seat according to claim 3, wherein the foam structure of the vehicle seat is provided therein with at least one soft inflatable bag accommodating groove configured to allow a corresponding soft inflatable bag to be placed.
6. The vehicle seat according to claim 5, wherein the foam structure is further provided therein with at least one covering body accommodating groove located in a direction of an opening of the at least one soft inflatable bag accommodating groove and configured to allow a corresponding covering body to be placed, wherein a trapezoidal structure is formed by the at least one covering body accommodating groove and a soft inflatable bag accommodating groove adjacent thereto.
7. The vehicle seat according to claim 5, wherein a heating pad is arranged between a seat cover and the corresponding soft inflatable bag in the at least one soft inflatable bag accommodating groove located on a side adjacent to the seat cover.
8. The vehicle seat according to claim 3, wherein
    the at least one soft inflatable bag comprises a plurality of soft inflatable bags, wherein solenoid valve modules are mounted in air paths of all soft inflatable bags in the vehicle seat, respectively, and a control module on the vehicle seat controls an inflation and a deflation of each of the soft inflatable bags independently of one another by controlling ON and OFF of each of the solenoid valve modules; or
    all the soft inflatable bags in the vehicle seat are arranged in groups, and the air paths of each group of the soft inflatable bags converge on a branch air path, wherein a branch solenoid valve module is mounted in the branch air path; and the control module controls the inflation and the deflation of each group of the soft inflatable bags by controlling ON and OFF of each group of the branch solenoid valve module, respectively.
9. The vehicle seat according to claim 4, wherein the foam structure of the vehicle seat is provided therein with at least one soft inflatable bag accommodating groove configured to allow a corresponding soft inflatable bag to be placed.
10. The vehicle seat according to claim 6, wherein a heating pad is arranged between a seat cover and the corresponding soft inflatable bag in the at least one soft inflatable bag accommodating groove located on a side adjacent to the seat cover.
11. The vehicle seat according to claim 4, wherein
    solenoid valve modules are mounted in air paths of all soft inflatable bags in the vehicle seat, respectively, and a control module on the vehicle seat controls an inflation and a deflation of each of the soft inflatable bags independently of one another by controlling ON and OFF of each of the solenoid valve modules; or
    all the soft inflatable bags in the vehicle seat are arranged in groups, and the air paths of each group of the soft inflatable bags converge on a branch air path, wherein a branch solenoid valve module is mounted in the branch air path; and the control module controls the inflation and the deflation of each group of the soft inflatable bags by controlling ON and OFF of each group of the branch solenoid valve module, respectively.
12. A device for adjusting comfort of a seat, comprising at least one soft inflatable bag capable of being integrated in the seat, wherein the at least one soft inflatable bag is filled with a flexible filler; the at least one soft inflatable bag is filled with gas; the at least one soft inflatable bag is provided therein with at least one height limiting structure configured to limit a partial expansion height of the at least one soft inflatable bag when inflated; and the at least one soft inflatable bag is further connected, via a connecting pipeline, with a shock absorption mechanism, wherein the shock absorption mechanism is configured to release pressure from the at least one soft inflatable bag, when a suddenly changed squeezing force is exerted on the at least one soft inflatable bag.

13. The device for adjusting comfort of a seat according to claim 12, wherein the at least one soft inflatable bag is connected with at least one air path and at least one air source configured to inflate the at least one soft inflatable bag through the at least one air path; and a gas is charged into or discharged from the at least one soft inflatable bag through the at least one air path, so as to adjust a softness of a surface of the seat.

14. The device for adjusting comfort of a seat according to claim 12, wherein the shock absorption mechanism comprises at least one elastic sealed pocket, wherein the connecting pipeline communicates a cavity of the at least one elastic sealed pocket with a cavity of the at least one soft inflatable bag; or the shock absorption mechanism comprises a cylinder, wherein the cylinder has a first cavity and a second cavity; the connecting pipeline communicates the cavity of the at least one soft inflatable bag and the first cavity with each other; the cylinder comprises a piston having a protruding end fixedly connected to one end of a return spring; and the other end of the return spring is connected to a fixed structure.

15. The device for adjusting comfort of a seat according to claim 12, further comprising a flow adjustment mechanism configured to adjust a flow rate in the connecting pipeline.

16. The device for adjusting comfort of a seat according to claim 15, wherein the flow adjustment mechanism comprises a hoop sleeved around the connecting pipeline, wherein the hoop comprises an annular portion provided with an opening, and a first adjusting piece and a second adjusting piece extend in parallel outward from two movable ends of the annular portion, wherein the first adjusting piece is provided with a threaded hole, and the second adjusting piece is provided with a smooth through hole corresponding to the threaded hole; and a screw handle passing through the smooth through hole is threadedly fixed in the threaded hole.

17. The device for adjusting comfort of a seat according to claim 16, further comprising a micromotor, wherein the micromotor has an output shaft fixedly connected to the screw handle in an axial direction; and the micromotor is controlled by a control module to rotate forward or reversely; and the control module is further configured to: control the micromotor to rotate, according to an input signal from an input module, to increase or decrease a gas flow passing through the connecting pipeline.

18. The device for adjusting comfort of a seat according to claim 12, wherein the at least one height limiting structure comprises at least one penetrating-type height limiting strap and/or at least one built-in height limiting strap; and/or the at least one soft inflatable bag is provided with several air guide channels extending through the at least one soft inflatable bag, wherein the air guide channels are isolated from a cavity of the at least one soft inflatable bag and configured to conduct gas on both sides of the at least one soft inflatable bag.

19. The device for adjusting comfort of a seat according to claim 13, wherein the shock absorption mechanism comprises at least one elastic sealed pocket, wherein the connecting pipeline communicates a cavity of the at least one elastic sealed pocket with a cavity of the at least one soft inflatable bag; or the shock absorption mechanism comprises a cylinder, wherein the cylinder has a first cavity and a second cavity; the connecting pipeline communicates the cavity of the at least one soft inflatable bag and the first cavity with each other; the cylinder comprises a piston having a protruding end fixedly connected to one end of a return spring; and the other end of the return spring is connected to a fixed structure.

20. The device for adjusting comfort of a seat according to claim 13, further comprising a flow adjustment mechanism configured to adjust a flow rate in the connecting pipeline.

* * * * *